United States Patent
Adachi et al.

(10) Patent No.: US 8,962,174 B2
(45) Date of Patent: Feb. 24, 2015

(54) BATTERY UNIT

(71) Applicants: Denso Corporation, Kariya, Aichi-pref. (JP); Suzuki Motor Corporation, Hamamatsu-shi, Shizuoka-pref. (JP)

(72) Inventors: Yoshiki Adachi, Okazaki (JP); Tatsuya Saito, Chiryu (JP); Hirobumi Awakawa, Hamamatsu (JP)

(73) Assignees: Denso Corporation, Kariya (JP); Suzuki Motor Corporation, Hamamatsu-shi (JP)

(*) Notice: Subject to any disclaimer, the term of this patent is extended or adjusted under 35 U.S.C. 154(b) by 63 days.

(21) Appl. No.: 13/935,757

(22) Filed: Jul. 5, 2013

(65) Prior Publication Data
US 2014/0011058 A1 Jan. 9, 2014

(30) Foreign Application Priority Data
Jul. 5, 2012 (JP) ................................. 2012-151370

(51) Int. Cl.
*H01M 6/42* (2006.01)
*H01M 10/42* (2006.01)
*B60L 3/00* (2006.01)
*B60L 11/18* (2006.01)
*H01M 2/10* (2006.01)

(52) U.S. Cl.
CPC .......... *H01M 10/425* (2013.01); *B60L 3/0046* (2013.01); *B60L 11/1861* (2013.01); *B60L 11/1877* (2013.01); *B60L 11/1879* (2013.01); *H01M 2/1077* (2013.01); *H01M 2220/20* (2013.01); *Y02T 10/7044* (2013.01); *Y02T 10/7005* (2013.01); *Y02T 10/705* (2013.01); *Y02T 10/7016* (2013.01); *Y02T 10/7011* (2013.01)
USPC ........................... 429/149; 429/121; 429/122

(58) Field of Classification Search
USPC ........................................ 429/149, 121, 122
See application file for complete search history.

(56) References Cited

U.S. PATENT DOCUMENTS
2011/0244283 A1 10/2011 Seto et al.

FOREIGN PATENT DOCUMENTS
JP  A-2011-107096  6/2011
JP  A-2011-216401  10/2011

*Primary Examiner* — Jane Rhee
(74) *Attorney, Agent, or Firm* — Oliff PLC

(57) ABSTRACT

A battery unit has a battery pack module that has a plurality of single cells, a control circuit board that has a control section that controls a charge and discharge in the battery pack module, and an accommodation case where the battery pack module and the control circuit board are accommodated. The control circuit board is disposed in a position above the battery pack module, and separated away from the base plate by a distance more than a distance from the base plate to a wall top end part of the wall section. Moreover, the submergence sensor is disposed in a position nearer to the base plate than to the wall top end part of the wall section that is in a space within the case 16 surrounded by the wall section.

5 Claims, 20 Drawing Sheets

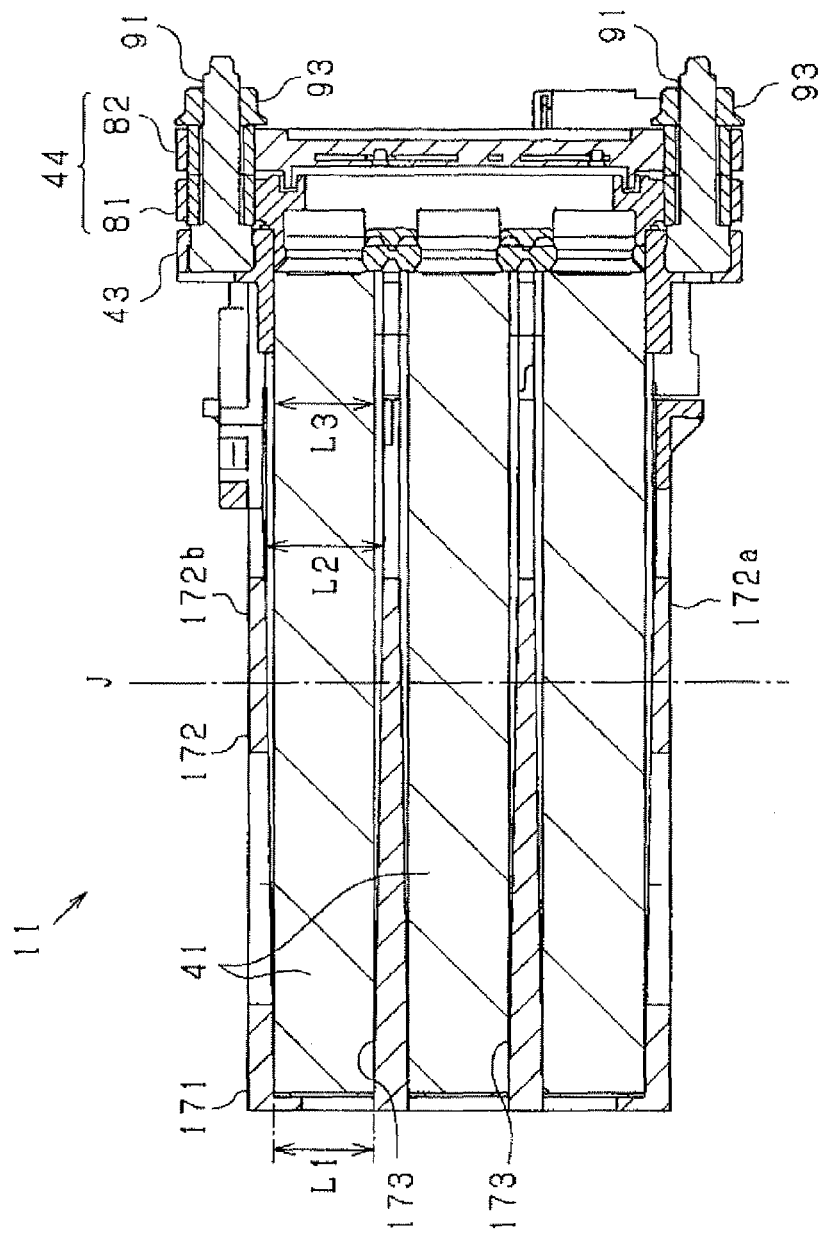

BATTERY UNIT

CROSS-REFERENCE TO RELATED APPLICATION

This application is based on and claims the benefit of priority from earlier Japanese Patent Application No. 2012-151370 filed Jul. 5, 2012, the description of which is incorporated herein by reference.

TECHNICAL FIELD

The present disclosure relates to a battery unit, which is constituted by having a battery pack module, installed in vehicles, such as a car, for example.

BACKGROUND

Conventionally, a technology that constitutes a battery unit by providing a battery pack module that has a plurality of single cells together with a control circuit board etc. unitarily is known (refer to Japanese Patent Application Laid-Open Publication No. 2011-216401, for example).

Moreover, installing such a battery unit in vehicles is proposed.

In a composition that the battery unit is installed in the vehicle, submergence of the battery unit is detected by a submergence sensor disposed in the battery unit, when the vehicle is flooded with water.

In this case, control sections such as a CPU mounted on a control circuit board perform a process that suspends a charge-and-discharge function of the battery pack module and the like according to a detected result of the submergence sensor.

However, if submergence of the battery unit is not appropriately detected when the vehicle is flooded with water or it goes into a puddle, various inconveniences will occur.

For example, if water is detected by the submergence sensor even though only a small amount of water enters the battery unit, and in fact that water level is not raised, an incorrect detection that the battery unit is in a submerged condition is produced, and functions of the battery unit such as the charge-and-discharge function of the battery pack module may be suspended unnecessarily.

On the other hand, if water is not easily detected in spite of the water level actually being raised, that is, in a composition that the water is detection by the submergence sensor only just before a submergence of a control section in the battery unit, it is possible that a control facility of the control section is suspended before it can suspend the battery charge and discharge, etc., and, in this case, it becomes impossible to performing proper countermeasure against flooding.

SUMMARY

An embodiment provides a battery unit that can detect submergence properly and can suspend battery charge and discharge, etc. suitably.

In a battery unit according to a first aspect, the battery unit has a battery pack module that has a plurality of single cells, a control circuit board that has a control section that controls a charge and discharge in the battery pack module, an accommodation case where the battery pack module and the control circuit board are accommodated, a base formed as the accommodation case that has a base plate where the battery pack module is installed and a wall section rising from the base plate so as to surround the battery pack module, and a submergence sensor electrically connected to the control section that detects submergence of the battery unit.

The control circuit board is disposed in a position that is one side of the battery pack module opposite to the base plate, and separated away from the base plate by a distance more than a distance from the base plate to a wall top end part of the wall section.

The submergence sensor is disposed in a position nearer to the base plate than to the wall top end part of the wall section that is in a space within the case surrounded by the wall section.

According to the composition mentioned above, when the battery unit is disposed so that the base plate is level, the submergence sensor is disposed lower than the wall top end part of the wall section of the base, and the control circuit board (control section) is disposed higher than the wall top end part.

That is, the control circuit board (control section), the wall top end part of the wall section, and the submergence sensor.

Therefore, when the battery unit is installed in vehicles, for example, flooding within the case does not occur until the water level exceeds the wall height of the wall section under the situation where the vehicle is flooded with the water and the battery unit is sunk.

Then, when the water level exceeds the wall height of the wall section, the flood (i.e., submergence) is detected by the submergence sensor when the space within the case starts to be flooded.

Since the control circuit board is not flooded yet when the flooding is started, the control section of the control circuit board can perform necessary tasks such as suspending the charge and discharge of the battery pack module by itself based on a detected signal of the submergence sensor before a functional stop, etc. of the battery unit caused by the flood.

Moreover, since the wall section is formed so as to surround the battery pack module in the base, in the extent where the battery unit is slightly flooded with the water or the water is splash onto the battery unit, for example, the submergence sensor does not detect the submergence, thus an incorrect detection of submergence is suppressed.

Thereby, unnecessary termination of the charge and discharge of the battery pack module, etc. is suppressed.

In a battery unit according to a second aspect, the accommodation case has a cover attached to the base, the cover has a top plate that covers the control circuit board, and hanging walls extended from the top plate, the base and the cover are assembled in a condition where one of the wall section of the base and the hanging walls of the cover is disposed inside the case and another is disposed outside the case so that they overlap in and out in a horizontal direction.

In a battery unit according to a third aspect, the base and the cover are assembled in the condition where the wall section of the base is disposed inside the case and the hanging walls of the cover are disposed outside the case.

In a battery unit according to a fourth aspect, the wall section has a shroud section continuously formed so as to surround the battery pack module that has a top end part as the wall top end part, and a plurality of supporting pillars that are higher than the wall top end part, and the control circuit board is fixed to the top end part of the supporting pillars.

In a battery unit according to a fifth aspect, the battery pack module has a battery case where the plurality of single cells are accommodated, the battery case is installed on the base plate so that the battery case is disposed in a space within the case, and a sensor mount for mounting the submergence sensor is integrally formed to an outside of a side of the battery case.

BRIEF DESCRIPTION OF THE DRAWINGS

In the accompanying drawings:

FIG. 22 shows a sectional view of another composition of a battery pack module.

DETAILED DESCRIPTION OF THE PREFERRED EMBODIMENTS

Figure 1:
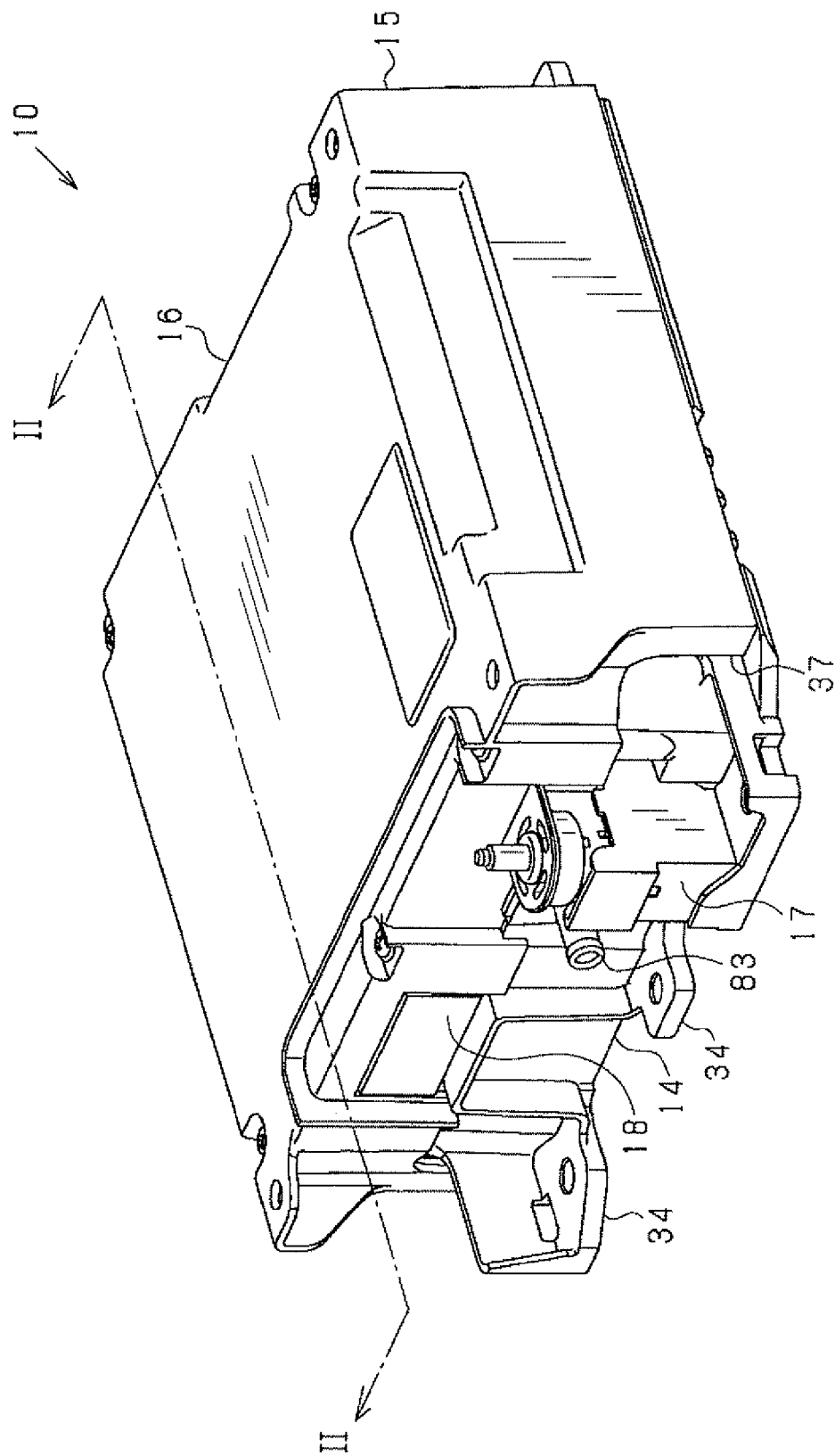
FIG. 1 shows a perspective view of a whole composition of a battery unit.

With reference to the drawings, hereinafter will be described an embodiment of the present disclosure.

In the present embodiment, a case suitable for an electric power system installed in vehicles is assumed.

The electric power system controls a sequential electric charge and discharge in an electricity accumulation section (power supply section) for supplying electric power to various in-vehicle electric loads.

The vehicle is equipped with an engine which is an internal-combustion engine, an in-vehicle ECU which controls the engine and other parts, a power generator (alternator) which is driven by the engine and generates electricity, and an electricity accumulation section charged by a generated electricity of the power generator.

Especially, it has a composition that uses a lead-acid battery and a lithium ion battery as the electricity accumulation section.

The present embodiment explains in detail about a Li battery unit (henceforth simply a battery unit) that functions as the lithium ion battery.

First of all, a whole composition of a battery unit 10 is explained using FIG. 1 to FIG. 6.

In addition, for convenience in the following explanation, a vertical direction of the battery unit 10 is specified on the basis of FIG. 1 where the battery unit 10 is disposed on a level surface.

The battery unit 10 has a battery pack module 11, a control circuit board 12, a restraining plate 13, and a accommodation case 16.

The battery pack module 11 has a plurality of single cells.

Moreover, the control circuit board 12 controls a charge and discharge in the battery pack module 11, etc.

Further, the restraining plate 13 restrains the battery pack module 11 from above.

Furthermore, the accommodation case 16 is made of a base 14 and a cover 15.

The battery pack module 11 and the control circuit board 12 are disposed in a vertical direction facing each other so that the battery pack module 11 is in the bottom and the control circuit board 12 is in the top, and both are fixed to the base 14.

Figure 5:
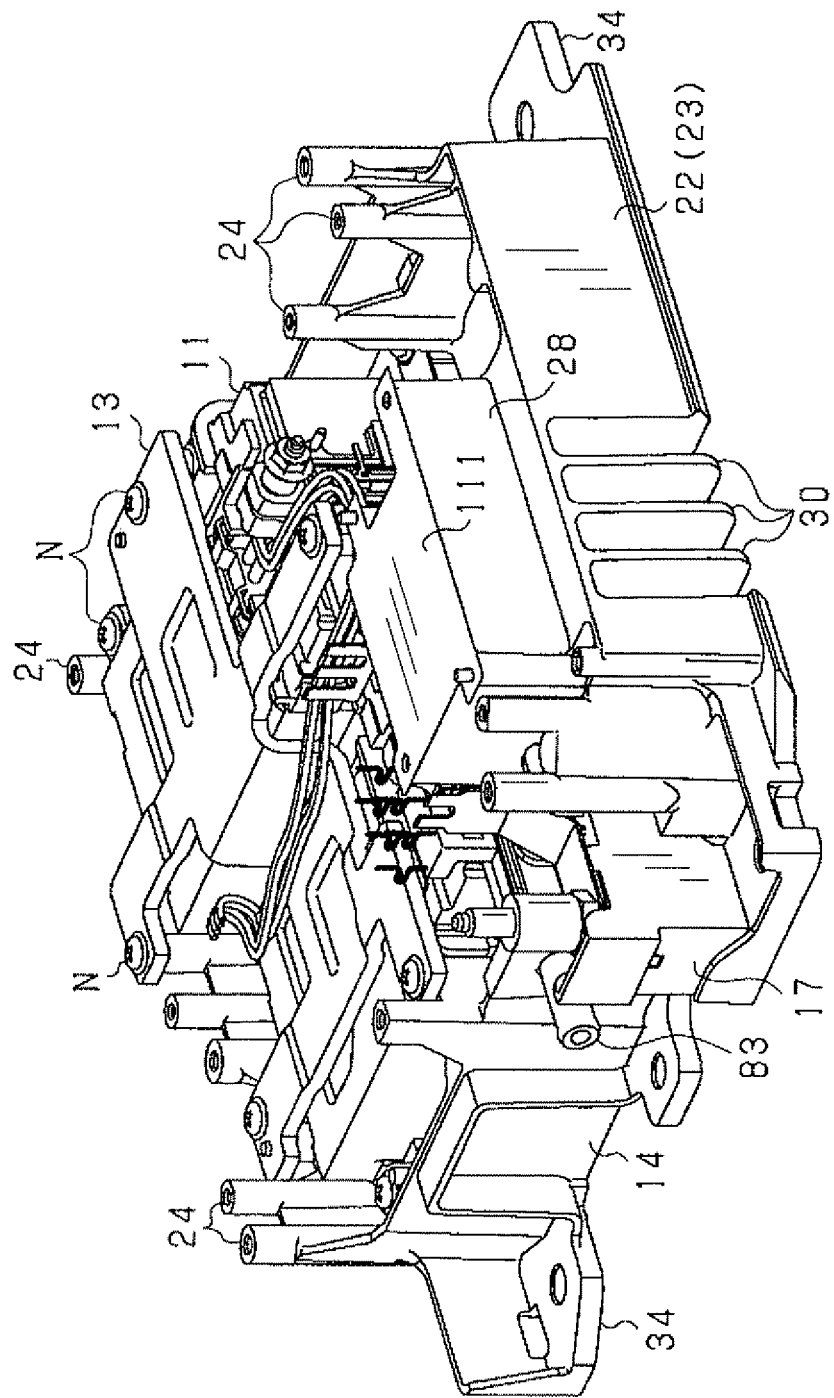
FIG. 5 shows a perspective view of the battery unit in a condition where a cover and a control circuit board are removed therefrom.
Figure 6:
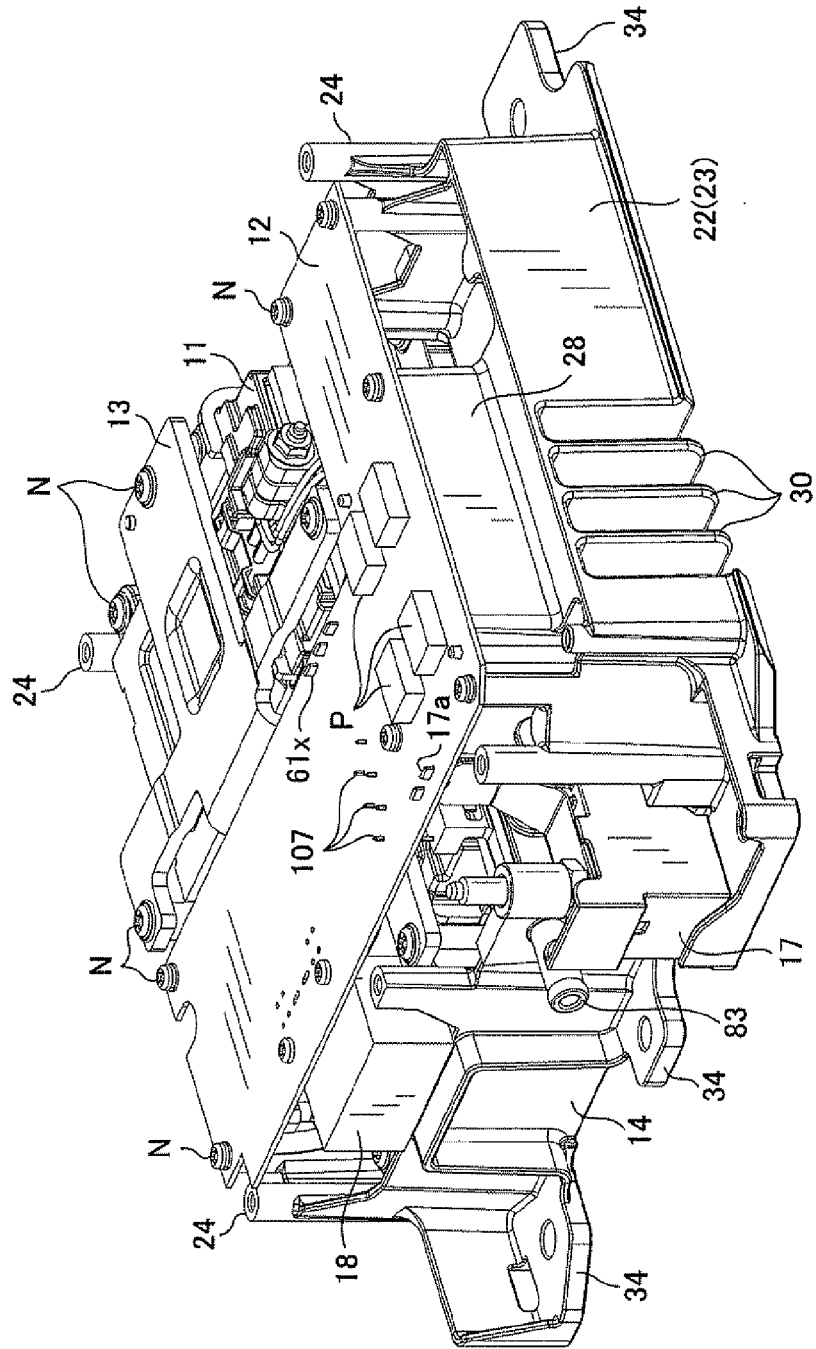
FIG. 6 shows a perspective view of the battery unit in a condition where only the cover is removed therefrom.
Figure 7:
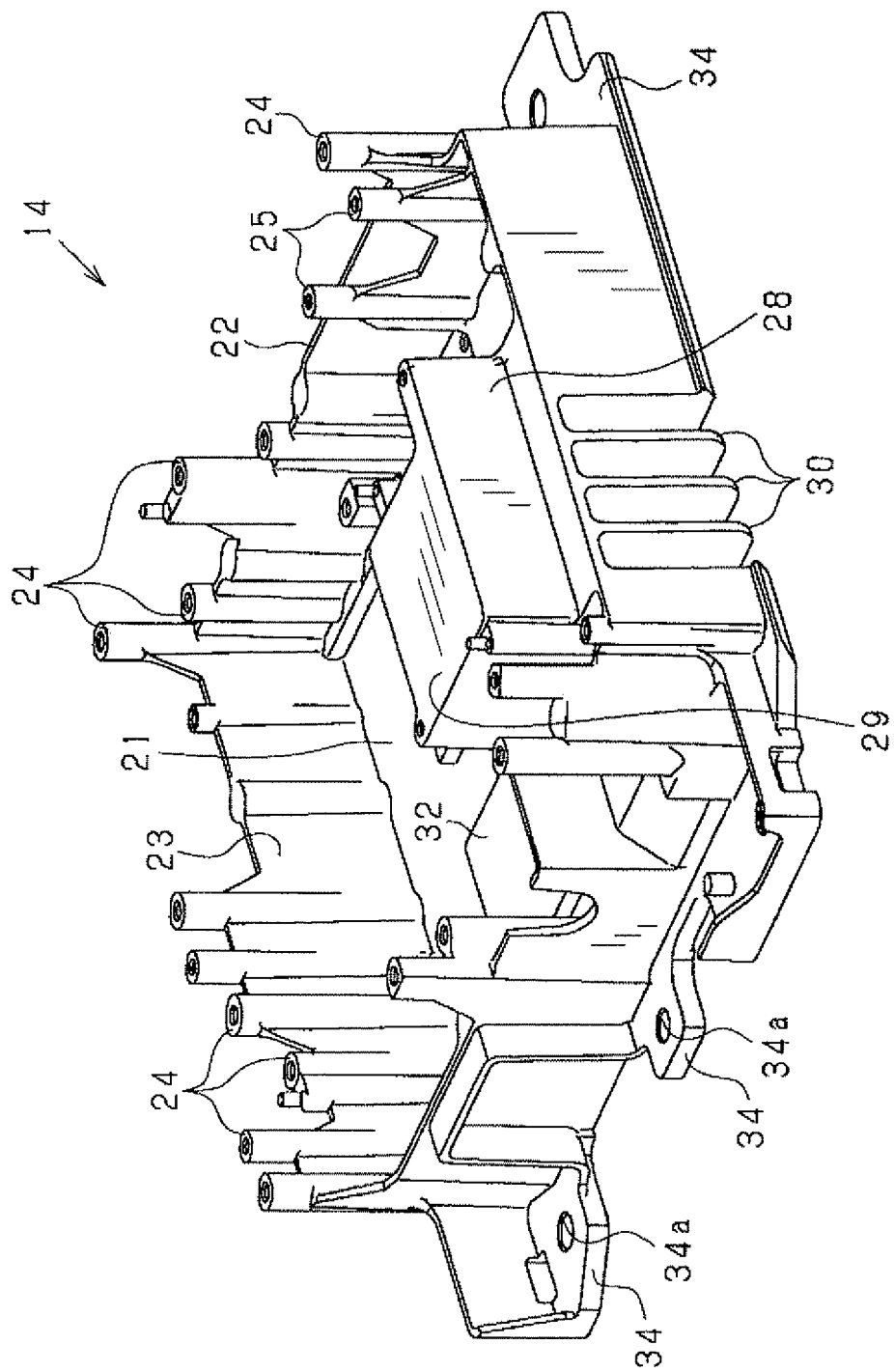
FIG. 7 shows a perspective view of a composition of a base.

FIG. 5 shows a condition where the battery pack module 11 and the restraining plate 13 are assembled to the base 14 f, and FIG. 6 shows a condition where the control circuit board 12 is further assembled as in FIG. 5.

Then, the battery unit 10 shown in FIG. 1 is produced by assembling the cover 15 from the top to the integrally assembled parts shown in FIG. 6, and the battery unit 10 is produced with the battery pack module 11 and the control circuit board 12 are accommodated in the accommodation case 16.

Moreover, the battery unit 10 has a terminal block 17 electrically connected to the lead-acid battery and the power generator outside the unit, and a connector 18 electrically connected to an in-vehicle ECU.

The terminal blocks 17 and the connector 18 are disposed to be exposed outside of the battery unit 10, as shown in FIG. 1.

Next, a composition of each part of the battery unit 10 is explained in detail.

<Accommodation Case 16>

The base 14 of the accommodation case 16 is explained.

The base 14 is fabricated by metal, such as aluminum, for example, and has a base plate 21 and a wall section 22 rising from the base plate 21.

The base plate 21 has substantially a square shape, and the wall section 22 is formed surrounding peripheral part or near a peripheral part of the base plate 21.

The base plate 21 is a module installation section in which the battery pack module 11 is installed.

In a condition where the battery pack module 11 is installed on the base plate 21, the battery pack module 11 is surrounded (enclosed) by the wall section 22.

The wall section 22 has a shroud section 23 continuously formed so as to surround the battery pack module 11, and a plurality of supporting pillars 24 extending upwardly from the shroud section 23.

In the wall section 22, a substantial wall height is suppressed by the shroud section 23, and a top end part of the shroud section 23 becomes a wall top end part.

In the condition where the base plate 21 is level and the base 14 is installed thereon, the height position of the top end part of the shroud section 23 becomes a marginal height of is the water infiltration into the base 14.

Each supporting pillar 24 is formed so as to extend higher than the top end part of the shroud section 23 (i.e., to a side opposite to the base plate side), and the battery pack module 11, the control circuit board 12, and the restraining plate 13 are fixed onto top end parts of these supporting pillars 24.

In this case, screw holes are formed in the top end parts of each supporting pillar 24, and the battery pack module 11, the control circuit board 12 and the restraining plate 13 are fixed with fixing screws N under a condition where each of these components are assembled from the top to predetermined positions.

In addition, a plurality of fixing pillars 25 where the battery pack module 11 and the control circuit board 12 are fixed are formed in the base 14 other than the supporting pillars 24 mentioned above.

The fixing pillars 25 are formed rising from the base plate 21 independently from the wall section 22.

A heat radiator that radiates heat generated in the battery pack module 11 or the control circuit board 12 outside is disposed in the base 14.

Figure 8A:
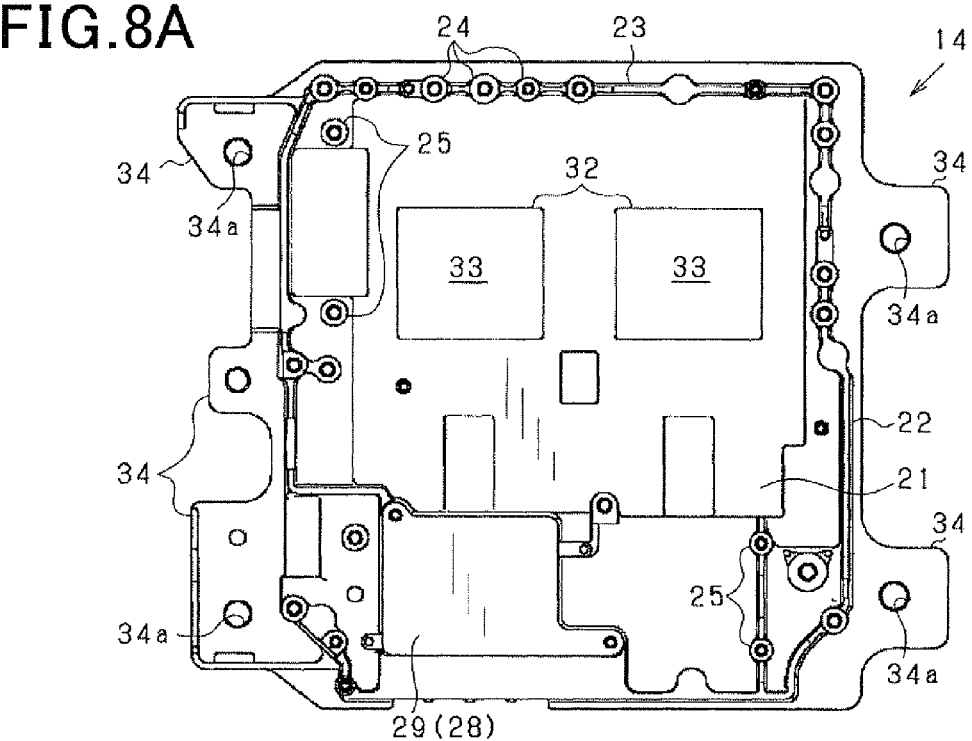
FIG. 8A shows a top plan view of the base.
Figure 8B:
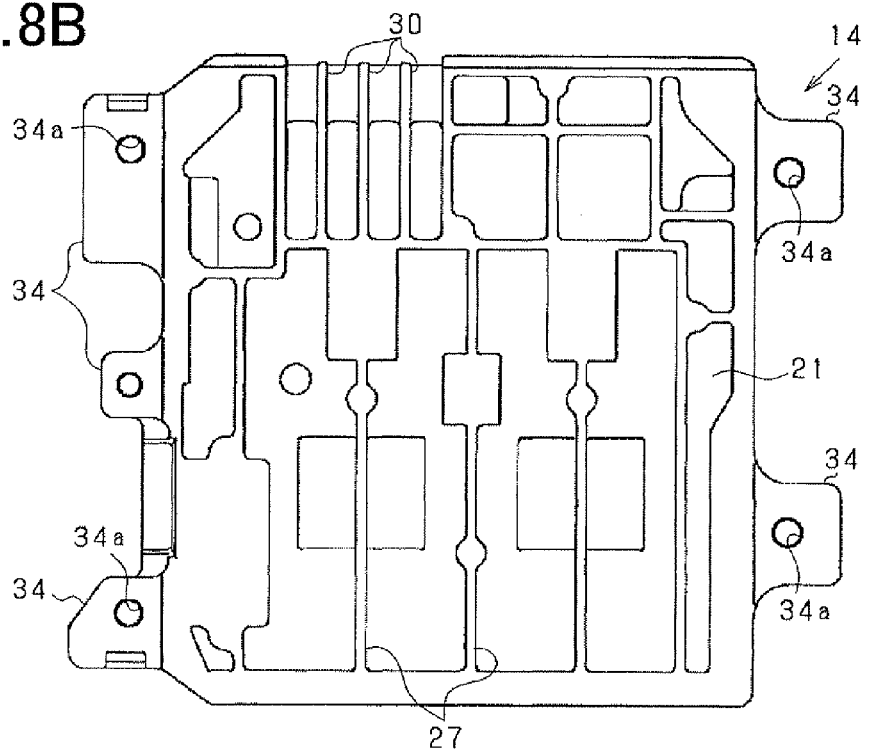
FIG. 8B shows a bottom plan view of the base.

As the heat radiator, specifically, ribs 27 for heat radiation are formed on a bottom surface side of the base plate 21 as shown in FIG. 8B.

In this case, the heat generated in the battery pack module 11 or the control circuit board 12 is conducted to the base plate 21 via the wall section 22, and is radiated out of the unit from the ribs 27 of the base plate 21.

Moreover, a heat radiating section 28 for power elements is formed on a top surface side of the base plate 21 so as to face a back side of the control circuit board 12.

Hereinafter, this is called an element heat radiator 28.

A top surface of the element heat radiator 28 is a facing plate part 29 that faces the control circuit board 12, and a plurality of fins 30 for heat radiation is formed on a bottom surface side the facing plate part 29.

The element heat radiator 28 is disposed facing mounted portions of power elements P in the control circuit board 12, and the heat generated by the power elements P is conducted to the facing plate part 29, and is further radiated out of the unit from the fins 30.

The power element P is made of a semiconductor element for an electric power, and a power transistor (power MOSFET or IGBT, for example) as the power elements P is disposed in an electric power passage that is lead to the battery pack module 11 in the battery unit 10.

The input and output of the electric power to the battery pack module 11 are controlled by opening and closing (ON and OFF) the power element P.

In addition, the battery unit 10 is connected to the lead-acid battery and the power generator, and the electric power passage lead to the battery pack module 11 is also an electric power passage that is lead to the lead-acid battery and the power generator.

Two projecting portions 32 projecting upwardly are formed in the top surface side of the base plate 21.

Upper surfaces of the projecting portions 32 are made flat, and when a swelling occurs on the single cell 41 of the battery pack module 11, the top surfaces of the projecting portions 32 become contacting surfaces 33 that contact the battery pack module 11 (swelled portion of the single cell 41 in the base plate side).

The contacting surface 33 of the projecting portion 32 is smaller than a bottom surface of the single cell 41 (mentioned later) of the battery pack module 11, and contacts to a part of the bottom surface side of the battery case 42.

In addition, flanges 34 are formed in the base plate 21 outside the wall section 22, and through holes 34a for inserting fixtures (bolt etc.) that fix the unit are formed in the flanges 34.

Figure 9:
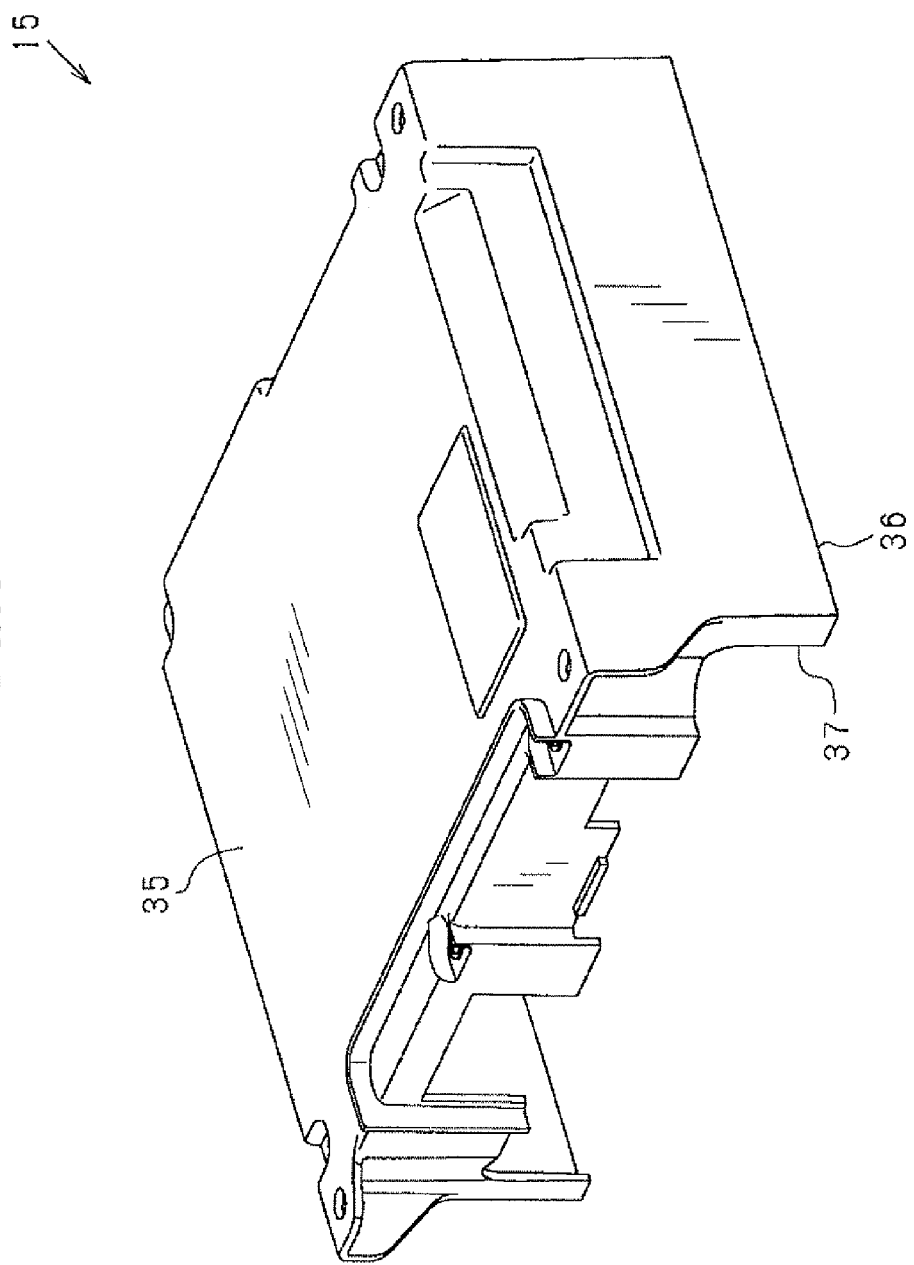
FIG. 9 shows a perspective view of a composition of the cover.
Figure 10:
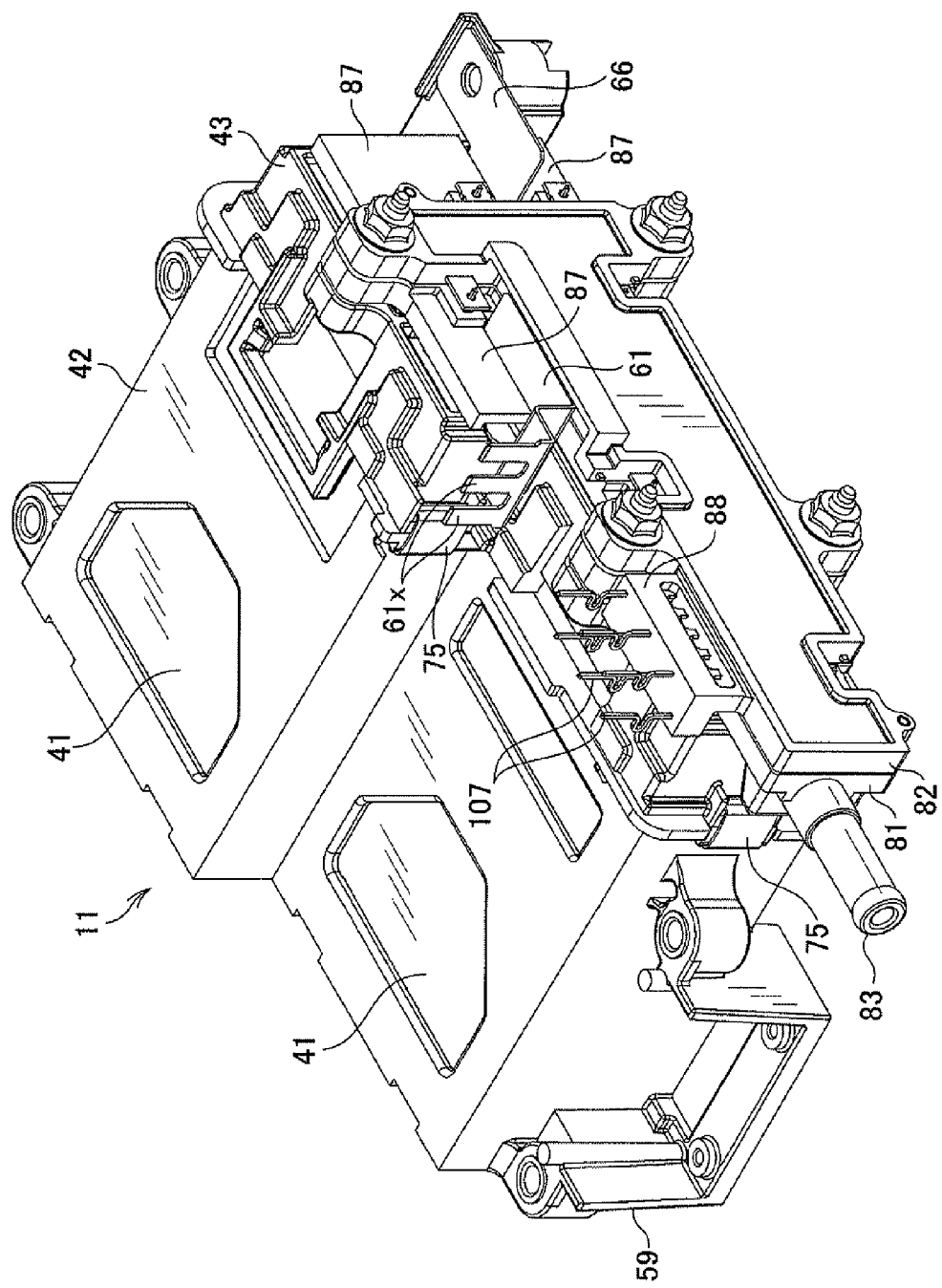
FIG. 10 shows a perspective view of a whole battery pack module.

On the other hand, the cover 15 has a composition shown in FIG. 9.

The cover 15 is formed of metal, such as aluminum, like the base 14, or is formed of synthetic resin material, and has a top plate 35 that covers the control circuit board 12 from the top, and hanging walls 36 extended from edges of the top plate 35.

The top plate 35 has substantially a square shape and the hanging walls 36 are formed surrounding peripheral part or near a peripheral part of the top plate 35.

A no-wall portion 37 for exposing the terminal block 17 and the connector 18 outside is formed in one of the hanging wails 36 disposed in four sides of the top plate 35.

Figure 2:
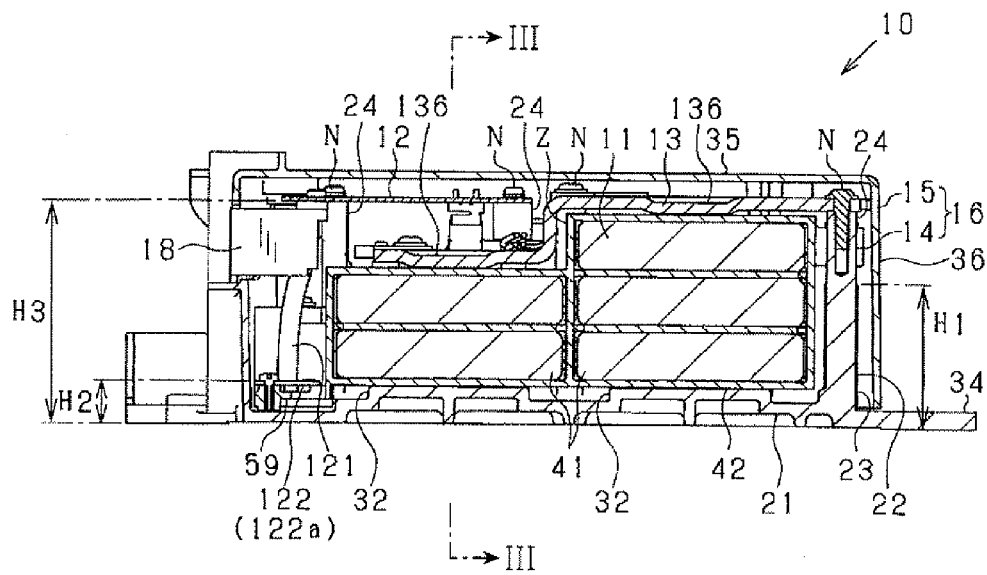
FIG. 2 shows a sectional view taken along a line II-II of FIG. 1.
Figure 3:
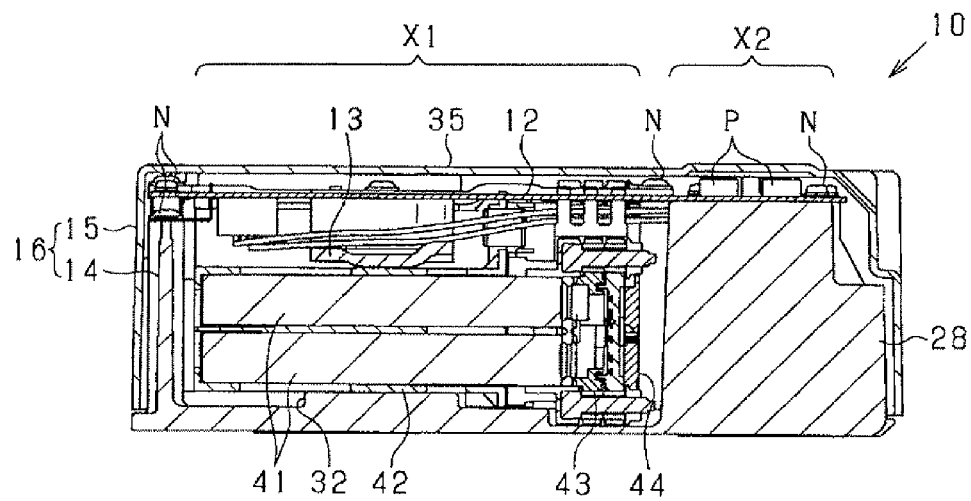
FIG. 3 shows a sectional view taken along a line of FIG. 2.

The base 14 and the cover 15 are assembled in a condition where the wall section 22 of the base 14 is disposed inside the case 16 and the hanging walls 36 of the cover 15 are disposed outside the case 16 so that they overlap in and out in the horizontal direction (refer to FIG. 2 and FIG. 3).

In this case, the cover 15 is disposed in a condition where a part of a bottom surface of the top plate 35 contacts the top end parts of the supporting pillars 24 of the wall section 22 in the base 14.

In this condition, the hanging walls 36 of the cover 15 and the shroud section 23 of the wall section 22 overlap in and out in the horizontal direction the case 16 (however, except for the portion where the no-wall-portion 37 is formed in the cover 15).

Thereby, in the condition where the battery unit 10 is flooded with the water, the water outside the unit infiltrates into a space within the case 16 by flowing through a gap between the wall section 22 and the hanging walls 36 upwardly, thus the water flowing into the space within the case 16 instantly can be prevented.

Moreover, even if water is poured to the battery unit 10 in a condition where the battery unit 10 is almost flooded with the water, the water does not permeate into the accommodation case 16 if the water level does not exceed the shroud section 23 which is an inner side of an overlapped portion of the case 16, and water infiltration other than from rising of the water level can be suppressed.

<Battery Pack Module 11>

Next, the battery pack module 11 is explained.

The battery pack module 11 roughly has a plurality of (five in the present embodiment) single cells 41, a battery case 42 where these single cells 41 are accommodated, an insulation cover 43 attached to the battery case 42, and an exhaust duct 44 overlapped on a side opposite to the battery of the insulation cover 43.

A main battery section Y is constituted by the plurality of single cells 41, the battery case 42 where the single cells are accommodated in a stacked condition, and the insulation cover 43.

<Single Cell 41>

Each of the five single cells 41 is a lithium ion battery that has a thin cuboid shape.

Figure 11:
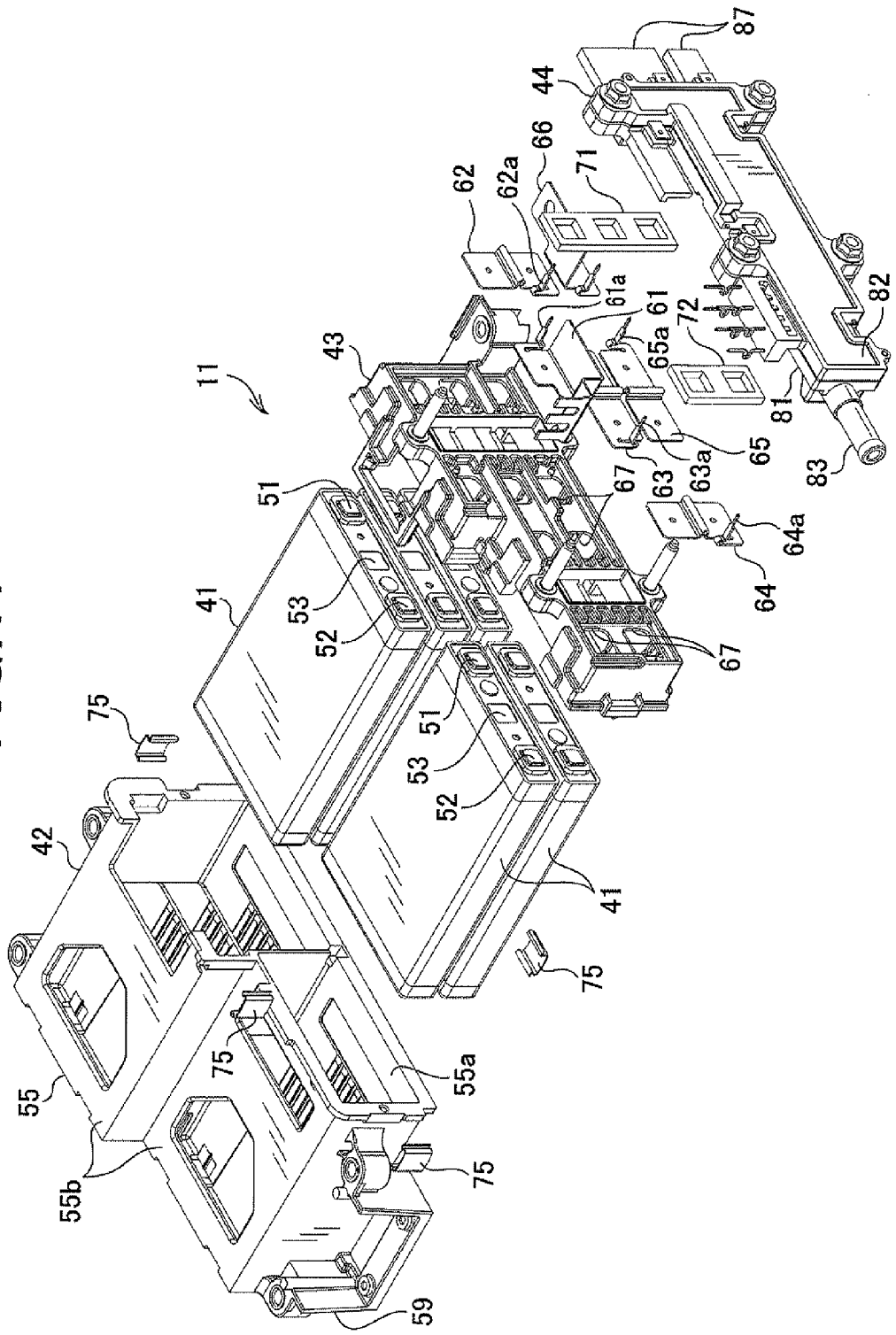
FIG. 11 shows a perspective view of disintegrated parts that constitute the battery pack module.

As shown in FIG. 11, an anode terminal 51 and a cathode terminal 52 are formed in one side of each single cell 41.

Each of the terminals 51 and 52 are constituted from electrode terminals projecting slightly from a side of the battery.

Moreover, an exhaust valve 53 is disposed between the anode terminal 51 and the cathode terminal 52 in each single cell 41.

The exhaust valve 53 is a safety valve that fractures and opens when an internal pressure of the single cell 41 becomes an abnormal pressure, and is constituted by closing a hole opened in an end face of an exterior case of the single cell 41 with a thin metallic film, for example.

The metallic film of the exhaust valve 53 fractures and the gas inside a battery, etc. is discharged outside the battery when the internal pressure of the single cell 41 becomes abnormal.

Thereby, the internal pressure the cell falls and a breakage of a single cell itself is suppressed.

<Battery Case 42>

The battery case 42 is a battery accommodation component for arranging the five single cells 41 in the predetermined stacked condition, and is made of synthetic resin material that has insulation property, for example.

Figure 14:
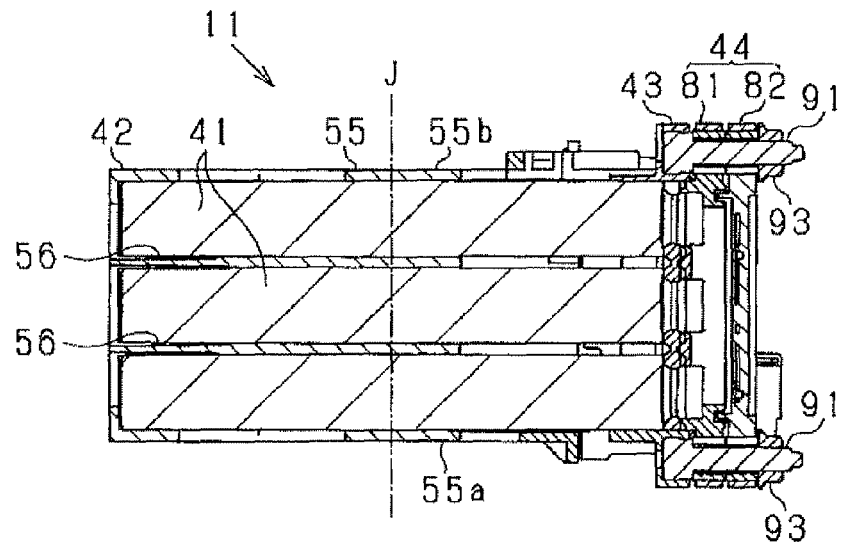
FIG. 14 shows a sectional view taken along a line XIV-XIV of FIG. 13.
Figure 15:
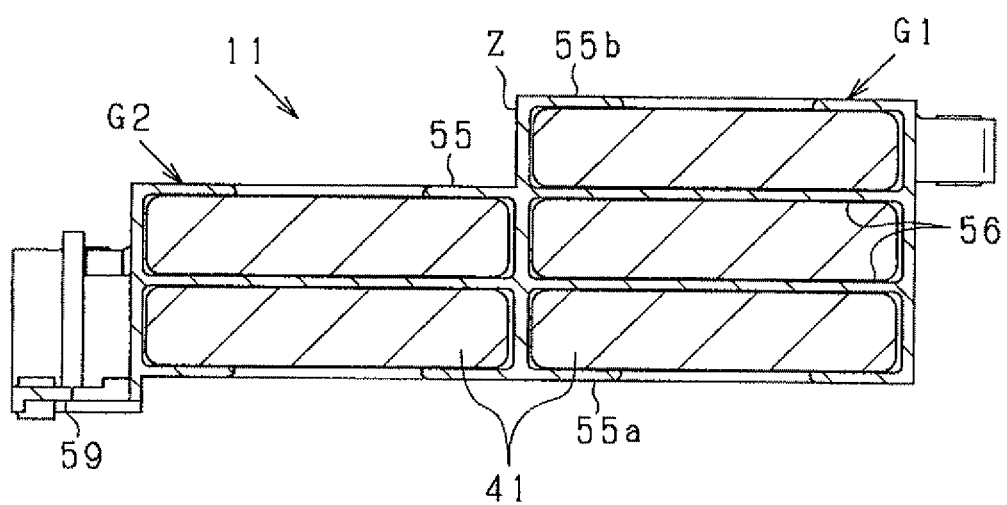
FIG. 15 shows a sectional view taken along a line XV-XV of FIG. 13.

As shown in FIG. 11, FIG. 14, and FIG. 15, the battery case 42 has a perimeter plate 55 that is a perimeter part, and partition plates 56 disposed between the single cells 41 that are stacked vertically.

In the battery case 42, a plurality of battery accommodation spaces divided in a vertical direction by the partition plates 56 are formed for every single cell.

The perimeter plate 55 includes a bottom plate 55a that becomes a bottom surface of the battery pack module 11 and faces the base plate 21 of the base 14, and a top plate 55b that becomes a top surface of the battery pack module 11.

The five single cells 41 are distributed into a battery group G1 with three cells stacked and a battery group G2 with two cells stacked, and a level difference equivalent to a thickness of one single cell is formed in the top surface (top plate 55b) of the perimeter plate 55 in the present embodiment.

Thereby, a level difference Z is formed in the top surface side of the battery pack module 11, and the control circuit board 12 is installed so as to match the position of the level difference Z (refer to FIG. 2).

In addition, using a space above the module formed by the level difference Z, wiring of various connection lines is performed beneath the circuit board, or electric parts, such as a thermistor, are disposed.

Each single cell 41 has a pair of maximum surfaces where areas become the largest among perimeter surfaces of the battery.

In addition, each single cell 41 is accommodated in the battery case 42 so as to be stacked each other disposing one of the maximum surfaces (bottom side in the figure) to the base plate 21 side, and the other surface (top side in the figure) to a side opposite to the base plate 21.

A part single cells 41 (an electrode side part) is protruded from the battery case 42 in the condition where each single cell 41 is accommodated in the battery case 42.

The insulation cover 43 is attached to the battery case 42 so as to cover a portion where the single cells 41 are protruded.

Although cut-outs (openings) that penetrate the bottom plate 55a and the top plate 55b vertically are formed in the battery case 42, it has a composition that plates (parts of the top plate 55b and the bottom plate 55a) face each other in the vertical direction at least in areas including central areas (3 in FIG. 14) of the single cells 41.

That is, it is considered that the amount of swelling becomes the maximum in a central area of the battery when the swelling occurs in each single cell 41, and it has a composition that case facing plates that face the single cells 41 exist in the central area of the battery.

A sensor mount 59 for mounting a submergence sensor 122 (mentioned later) in predetermined height relative to the top surface of the base plate 21 of the base 14 is integrally molded to a side of the battery case 42.

The sensor mount 59 is disposed projecting in sideways from the perimeter plate 55 of the battery case 42, and the submergence sensor 122 should be installed at the same height as the bottom plate 55a of the battery case 42 (refer to FIG. 2).

<Insulation Cover 43>

As shown in FIG. 11, there are a plurality of (ten in the present embodiment) openings 67 formed corresponding to positions of the anode terminals 51 and the cathode terminals 52 of each single cell 41 in the insulation cover 43.

The terminals 51 and 52 of each single cell 41 are inserted to the plurality of openings 67 by assembling the insulation cover 43 to the battery case 42.

Figure 12:
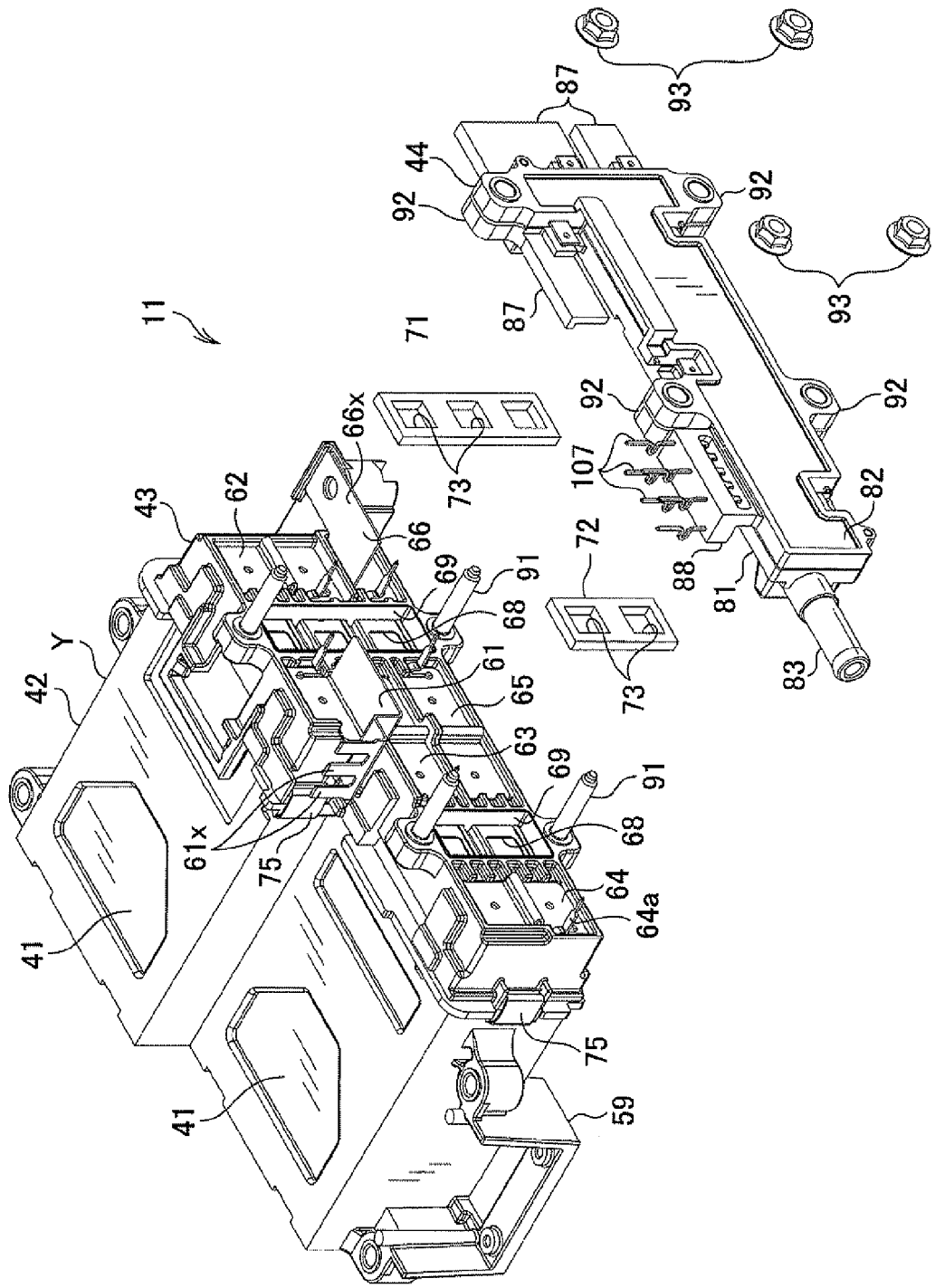
FIG. 12 shows a perspective view of disintegrated parts that constitute the battery pack module.
Figure 13:
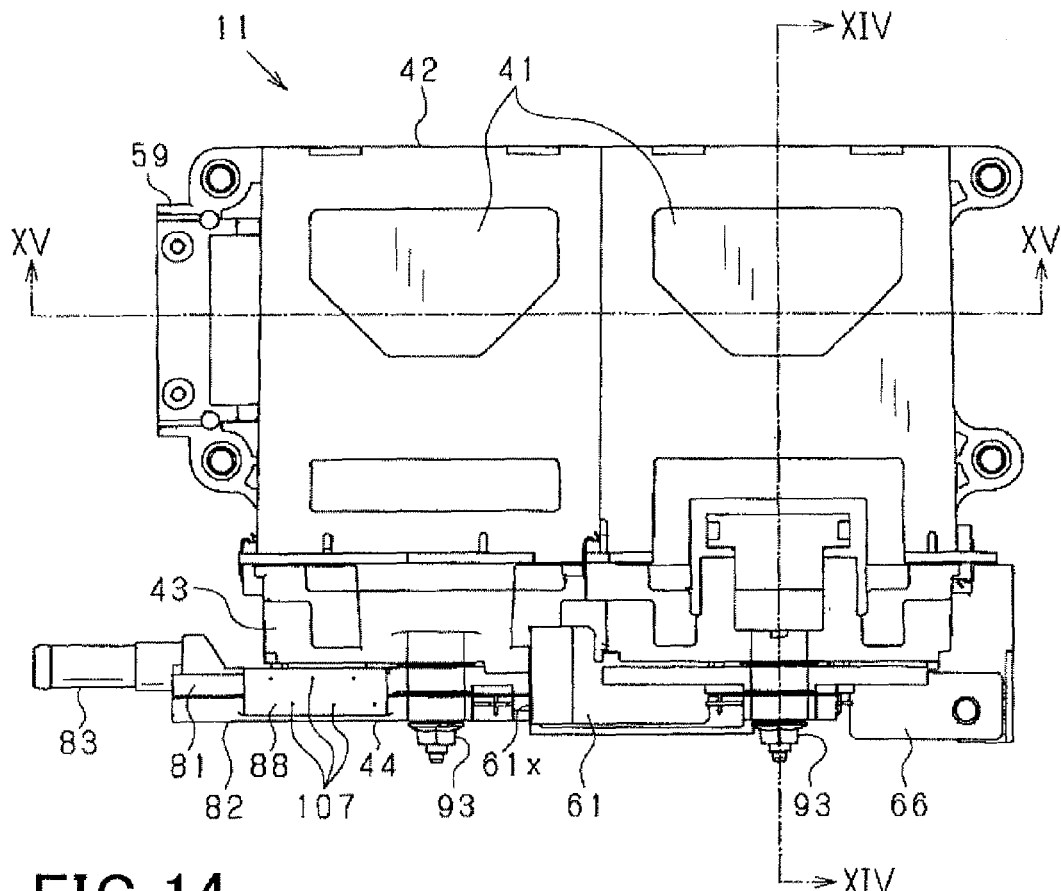
FIG. 13 shows a plan view of the battery pack module.

Then, under this condition, a plurality of bus bars 61 to 66 are attached to the insulation cover 43 so as to close each of the openings 67 (FIG. 12).

The bus bars 61 to 66 are electrode connecting terminals that are connected to each electrode of the plurality of single cells 41 aligned in vertical and horizontal directions, and connect each of these single cells 41 in series.

A condition shown in FIG. 12 is the condition where the bus bars 61 to 66 are attached to the insulation cover 43.

The four bus bars 62 to 65 among the all the six bus bars 61 to 66 are connecting terminals that electrically connect the single cells 41 mutually.

The anode terminal 51 of one single cell 41 and the cathode terminal 52 of the other single cell 41 are electrically connected by these bus bars 62-65 for every two single cells 41 adjoining in the vertical or horizontal direction.

Specifically, the anode and cathode terminals 51 and 52 of two single cells 41 adjoining in vertical direction are connected by the bus bars 62 and 64, and the anode and cathode terminals 51 and 52 of two single cells 41 adjoining in horizontal direction are connected the bus bars 63 and 65.

Moreover, the bus bar 61 is a connecting terminal for connecting the positive side terminal of the battery pack that the five single cells 41 are connected in series to the control circuit board 12.

Furthermore, the bus bar 66 is a connecting terminal for connecting the negative side terminal of the battery pack to a ground.

The bus bar 61 is connected to the anode terminal 51 of the single cell 41 that is one end side of an in-series battery circuit among the five single cells 41.

Moreover, terminal parts 61x that are connected to the control circuit board 12 are formed on a projecting portion projected to a side opposite to the battery from the electrode terminal parts connected to the anode terminal 51 in the bus bar 61.

Specifically, the terminal parts 61x are disposed extending towards the area above the battery pack module 11.

Moreover, the bus bar 66 is connected to the cathode terminal 52 of the single cell 41 that is the other end side of the in-series battery circuit.

Furthermore, a grand terminal part 66x that is connected to the ground (for example, vehicles body) is formed on a projecting portion projected to a side opposite to the battery from the electrode terminal parts connected to the cathode terminal 52 in the bus bar 66.

Voltage sensing terminals 61a to 66a projecting to a side opposite to the battery are disposed in each bus bar 61 to 66 unitarily.

Moreover, as shown in FIG. 12, a plurality of openings 68 (five openings in the present embodiment) corresponding to the positions of the exhaust valves 53 of each single cell 41 is formed in the insulation cover 43 other than the openings 67 for electrodes mentioned above.

In the insulation cover 43, recessed portions 69 are formed in a side opposite to the battery of each opening 68 for every battery group in the horizontal direction, and packings 71 and 72 are attached to the respective recessed portions 69.

In this case, a total of five openings 73 are formed in the packings 71 and 72, and in a condition where the packings and 72 are attached to the insulation cover 43, the openings 68 of the insulation cover 43 and the openings 73 of the packings 71 and 72 are communicated.

The insulation cover 43 is formed by a material that has electric insulation properties like synthetic resins, such as polypropylene (PP resin) or PP resin that contains a filler or talc, for example.

In addition, it is preferable to form the insulation cover 43 by the synthetic resin that has heat resistance and heat is insulation properties.

The battery case 42 and the insulation cover 43 are assembled using a plurality of metal fittings 75.

Specifically, projecting portions are formed in joint ends of both the battery case 42 and the insulation cover 43, and the battery case 42 and the insulation cover 43 are assembled by sandwiching both the projecting portions of each other by the metal fittings 75.

<Exhaust Duct 44>

Next, the exhaust duct 44 is explained.

The exhaust duct 44 has a collecting space section that collects gas and electrolyte flowing out from inside the battery when the exhaust valve 53 of each single cell 41 is opened.

The exhaust duct 44 has a first body 81 and a second body 82 to form the collecting space section.

The first body 81 is disposed in the battery side, and the second body 82 is disposed to a side opposite to the battery.

Each of the bodies 81 and 82 are formed with a material that has heat resistance so that melting does not occur even if the inside of the single cell 41 becomes in an unusual high-pressure condition and hot gas and electrolyte, etc. flow out of the exhaust valve 53, and it is formed by polyphenylene sulfide resin (PPS), polybutylene terephthalate (PBT), the various resin that flame retardant is added, etc., for example.

Moreover, it is preferable to form the exhaust duct 44 by the synthetic resin that has heat insulation properties.

Figure 16:
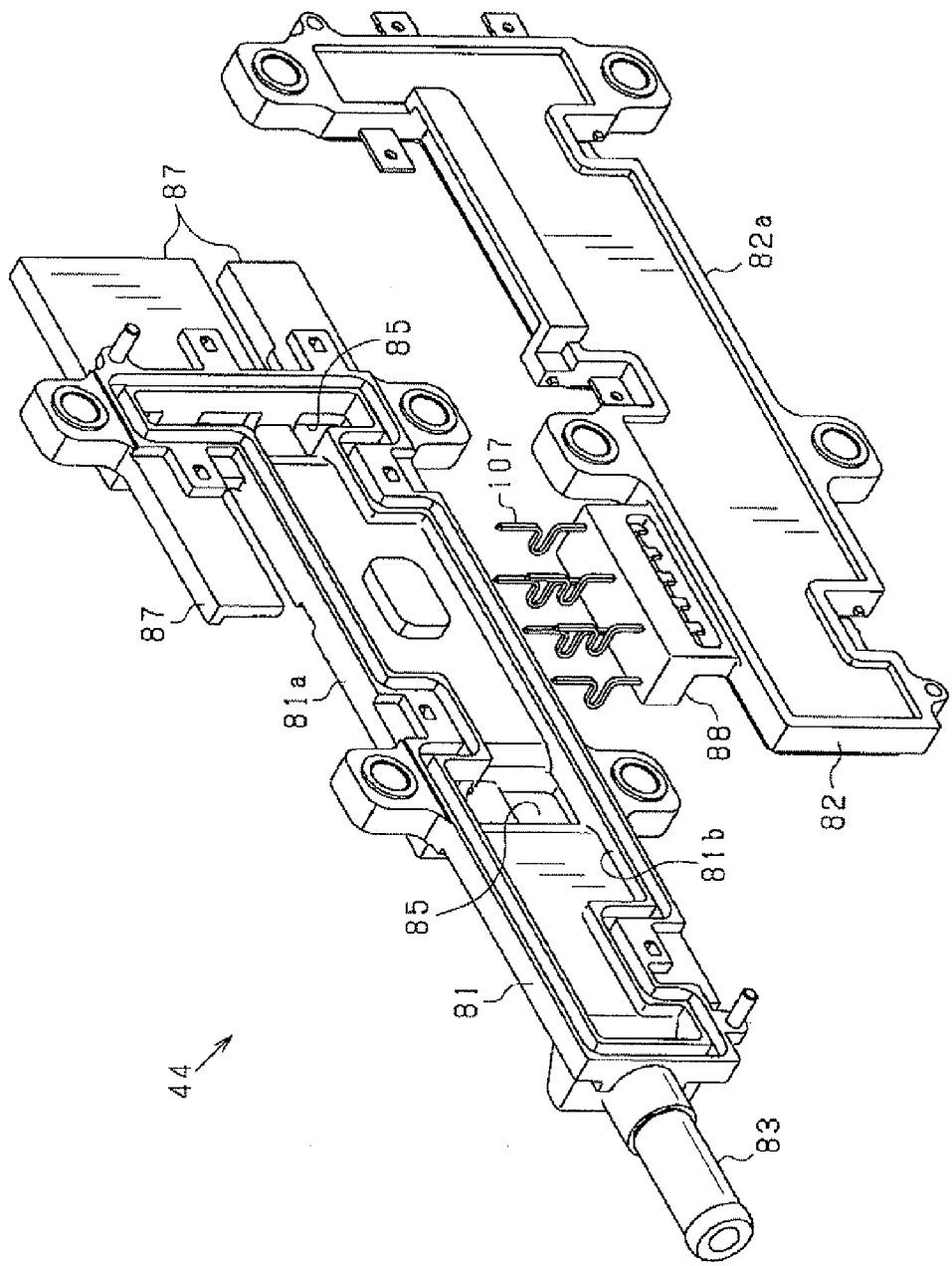
FIG. 16 shows a perspective view of disintegrated exhaust duct.

A recessed portion for forming recovery space is formed in at least one of the bodies 81 and 82 (a recessed portion 81b disposed in a main body section 81a of the first body 81 is shown in FIG. 16), and the collecting space section is formed in the inside the duct by joining both the bodies 81 and 82.

The recessed portion for forming recovery space may be disposed in the second body 82 instead of, or adding to the first body 81.

In addition, a heat-resistant seal that has heat resistance is disposed to a connecting part of both the bodies 81 and 82.

A discharge port 83 that communicates to the collecting space section inside the duct is formed unitarily with the first body 81.

The discharge port 83 has a function that discharges the gas and the electrolyte collected in the collecting space section to outside the battery unit 10.

Moreover, five openings 85 are formed in positions that match with each exhaust valve 53 of the five single cells 41 in the first body 81.

In the condition where the exhaust duct 44 is assembled to the insulation cover 43, the exhaust valves 53 communicate with the openings 85 of the first body 81 through each opening 68 and 73 of the insulation cover 43 and the packings 71 and 72.

In addition, the packings 71 and 72 function as a leak suppressing means, gas leaks and liquid leaks are suppressed by the packings 71 and 72.

In both the bodies 81 and 82, the collecting space section has a size large enough to cover all the exhaust valves 53 of the insulation cover 43, and some bus bars (bus bars 63, 64, and 65) among the bus bars 61 to 66 are covered from the side opposite to the battery by the plate-like main body sections 81a and 82a for forming recovery space, in addition to all the exhaust valves 53.

On the other hand, the remaining bus bars (bus bars 61, 62, and 66) are not covered by the main body sections 81a and 82a.

Overhang plates 87 are disposed to a plurality of places so as to juts out sideways from the main body section 81a in the first body 81, and the bus bars 61, 62, and 66 are covered by the overhang plates 87 from the side opposite to the battery.

In addition, regarding the bus bars 61 and 66, the whole parts of the bus bars 61 and 66 are not covered but portions except projecting parts (parts that form the circuit board side terminals and the ground side terminals) projected to a side opposite to the battery are covered by the overhang plates 87.

The overhang plates 87 constitutes a protection means to protect the bus bars 61, 62, and 66, and by the overhang plates 87, inconveniences that tool and other parts contact the bus bars 61, 62, and 66 at the time of working on the group of the battery pack module 11 during the assembling of the battery unit 10 can be suppressed, for example.

As shown in FIG. 12, connecting bars 91 extended to a side opposite to the battery are disposed in a plurality of places (four places in the present embodiment) in the insulation cover 43 as a structure of attaching the exhaust duct 44 to the insulation cover 43.

Moreover, a plurality of insertion parts 92 that has through holes for inserting the connecting bars 91 are formed in the exhaust duct 44.

A male screw is formed on a tip of the each connecting bar 91, and in the condition where the connecting bars 91 are inserted to the through holes of the insertion parts 92, the exhaust duct 44 is attached to the insulation cover 43 by fastening nuts 93 to the male screws.

Moreover, regarding the battery pack where the five single cells 41 are connected in series, the exhaust duct 44 is provided with a voltage output pathway for outputting the terminal voltage of each single cell 41 to the control circuit board 12.

Figure 17:
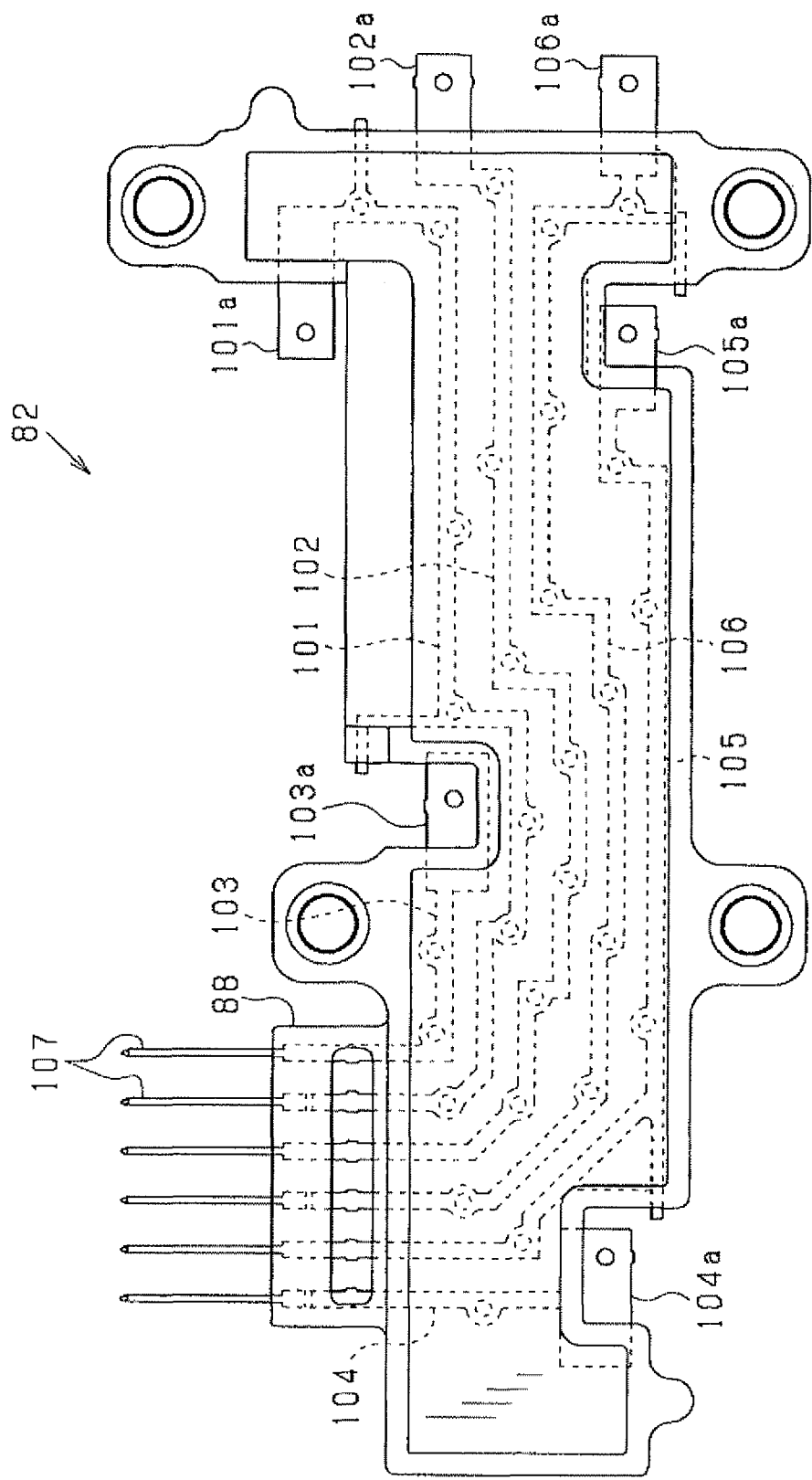
FIG. 17 shows a forming pattern of metal conductors in a second body.

Specifically, as shown in FIG. 17, of the metal conductors 101-106 are insert-molded to the second body 82 as a conductive member that outputs a detected voltage detected by the voltage sensing terminals 61a to 66a of each bus bar 61 to 66 to the control circuit board 12.

In addition, the voltage output pathway is formed for every bus bar 61 to 66 by the metal conductors 101-106.

All of the metal conductors 101-106 are a rectangle-cross-sectional flat conductor, and are formed by punching a copper plate that has a good electric conductivity, for example.

Electrode side connecting terminals 101a to 106a connected to the sensing terminal 61a to 66a of the bus bars 61 to 66 are provided to one ends of each metal conductor 101-106.

The electrode side connecting terminals 101a to 106a are disposed dispersedly corresponding to the position of each sensing terminal 61a to 66a. Groups of matched positions such as the electrode side connecting terminal 101a and the sensing terminal 61a, the electrode side connecting terminal 102a and the sensing terminal 62a, the electrode side connecting terminal 103a and the sensing terminal 63a, the electrode side connecting terminal 104a and the sensing terminal 64a, the electrode side connecting terminal 105a and the sensing terminal 65a, and the electrode side connecting terminal 106a and the sensing terminal 66a are disposed.

The electrode side connecting terminals 101a to 106a are disposed so as to project outside of the second body 82. Moreover, although not shown, penetration holes are formed in the electrode side connecting terminals 101a to 106a, and the sensing terminals 61a to 66a and the electrode side connecting terminal 101a to 106a are connected in the condition where the sensing terminals 61a to 66a are inserted to the penetration holes.

It is preferred that the connection is performed by soldering, welding, adhesion, screw-fastening, etc.

Moreover, control circuit side connecting terminals 107 that have the same number as the metal conductors 101-106 are connected to the other ends of the metal conductors 101-106.

Each of the control circuit side connecting terminals is made of a stick-like metal member having a square cross-section or a circular cross-section.

The control circuit side connecting terminals 107 are disposed collectively in a terminal supporting part 88 formed in an upper part of the second body 82, and are put in order in the terminal supporting part 88 in predetermined arrangement (three in two rows in the present embodiment).

Each of the control circuit side connecting terminals 107 is extended towards above in the vertical direction, and tips thereof are connected to the control circuit board 12.

Each control circuit side connecting terminals 107 is constituted by an elastically deformable elastic material, and bent portion 107a as a displacement absorption part is formed in a part in a longitudinal direction. However, the details are mentioned later.

In addition, the control circuit side connecting terminals 107 are preferred to be connected by welding or fastening to the metal conductors 101-106.

Moreover, the control circuit side connecting terminals is 107 may be integrally molded with the metal conductors 101-106.

<Control Circuit Board 12>

Next, the control circuit board 12 is explained.

For the attached condition of the control circuit board 12 in the battery unit 10, FIG. 2, FIG. 3, and FIG. 6 should be referred.

Figure 18:
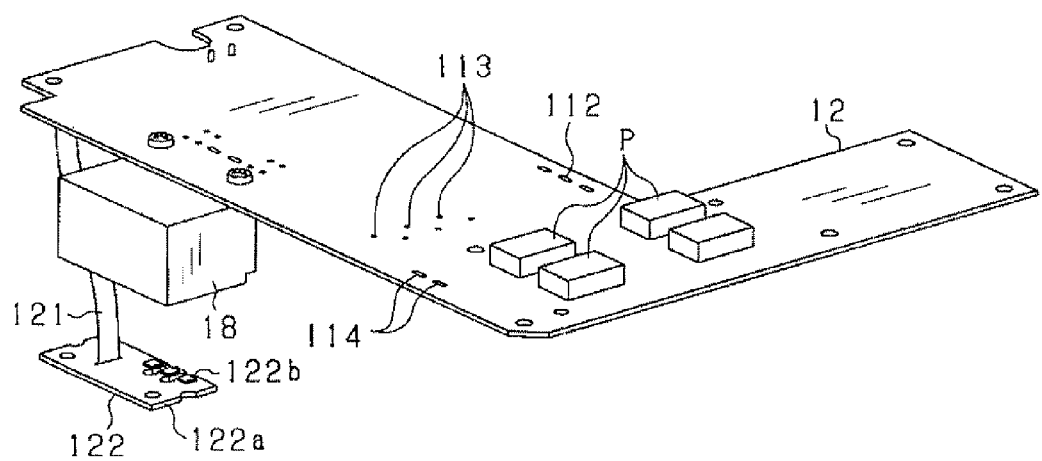
FIG. 18 shows a perspective view of the control circuit board and a composition attached thereto.

As shown in FIG. 18, the control circuit board 12 is made of a printed circuit board that has an L-shape (re-entrant polygon), and various kinds of electronic components and the connector 18 are mounted on a circuit board surface.

A CPU (Central Processing Unit, control computing element) as a control section that performs processing of charge-and-discharge control of the battery pack module 11, etc., and the mentioned above power elements P are included in the electronic components.

The control circuit board 12 has an overlapping area that overlaps with the battery pack module 11 in the vertical direction (i.e., a portion right above the battery pack module 11), and a non-overlapping area that does not overlap with the battery pack module 11 in the vertical direction, and the power elements P are arranged at the non-overlapping area.

Thereby, the element heat radiator 28 of the base 14 and the mounted portions of the power elements P can be disposed facing each other in the vertical direction as mentioned above, and heat generated by the power elements P is emitted outside through the element heat radiator 28 (refer to FIG. 3).

Figure 4:
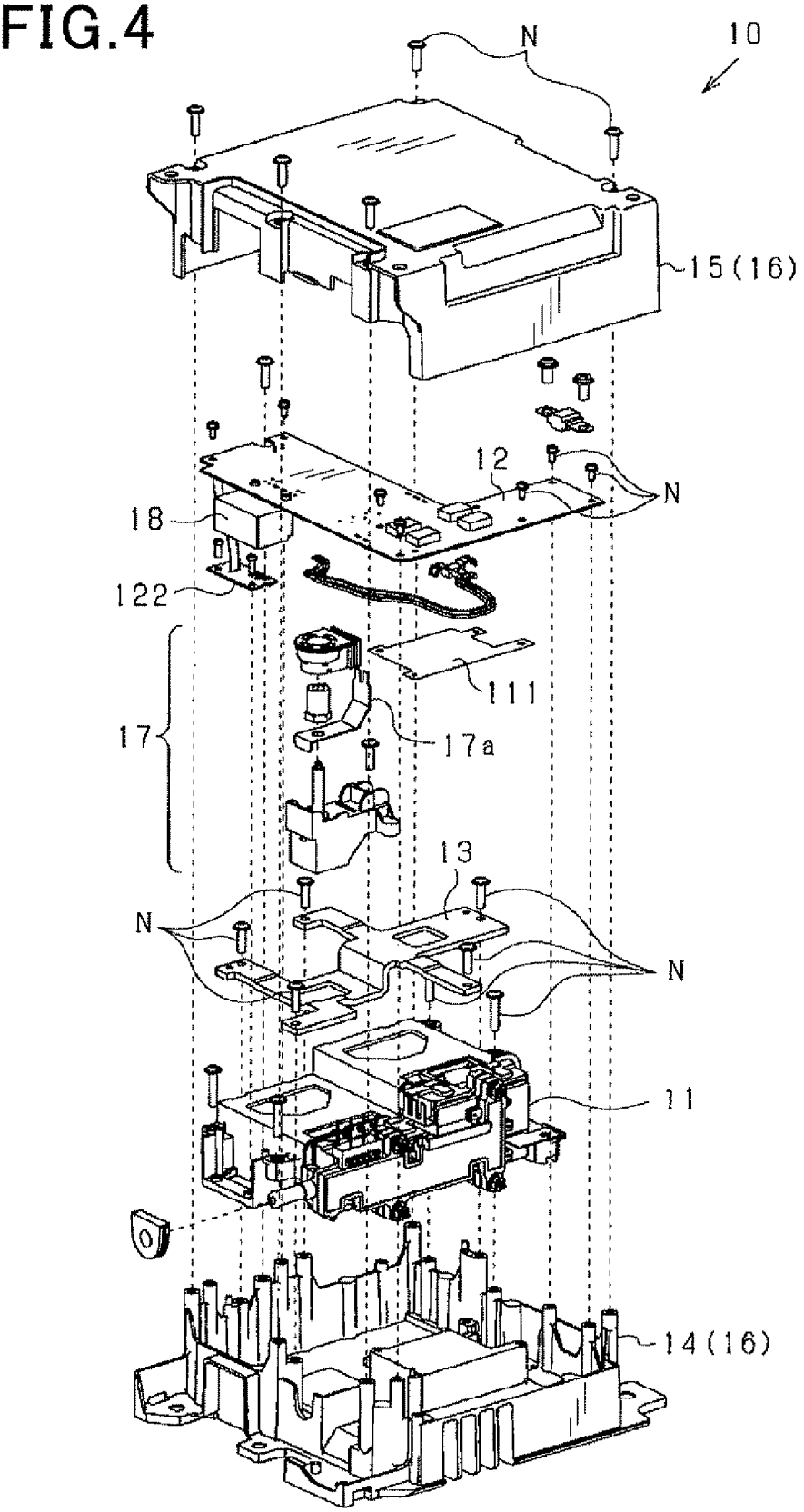
FIG. 4 shows a perspective view where a main composition of the battery unit is disintegrated.

In addition, an insulating sheet 111 is disposed between the facing plate part 29 of the element heat radiator 28 and the control circuit board 12, so that the element heat radiator 28 and the control circuit board 12 are insulated electrically (refer to FIG. 4 and FIG. 5).

The control circuit board 12 is disposed in one side of the battery pack module 11 opposite to the base plate 21.

A plurality of through holes 112, 113, and 114 are disposed on the control circuit board 12. The terminal parts 61x of the bus bar 61 is inserted in the through holes 112, the control circuit side connecting terminals 107 are inserted in the through holes 113, and the bus bar 17a (refer to FIG. 6) of the terminal block 17 is inserted in the through holes 114.

The terminals etc. mentioned above are fixed by soldering in each through hole 112 to 114.

Regarding the control circuit side connecting terminals 107, the connecting terminals 107 are electrically connected to a voltage detecting circuit of the control circuit board 12 by fixing the control circuit side connecting terminals 107 to the through holes 113.

In the control circuit board 12, the through holes 113 are formed in the overlapping area that overlaps with the battery pack module 11 in the vertical direction (i.e., the portion right above the battery pack module 11).

Furthermore, the battery pack module 11 has the battery group G1 with three single cells 41 stacked and the battery group G2 with two single cells 41 stacked, and the through holes 113 are formed right above a portion that is the battery group G2 side (lower step side).

That is, the control circuit side connecting terminals 107 are disposed using a space formed by a stepped part of a top surface of the battery pack module 11 between the battery pack module 11 and the control circuit board 12.

Here, considering both the battery pack module 11 and the control circuit board 12, relative position between the both may change due to the vibration of the vehicle, change of ambient air temperature, etc.

Especially in the present embodiment, the battery pack module 11 and the control circuit board 12 are fixed with the fixing screws N individually to the base 14 of the accommodation case 16.

Therefore, although the battery pack module 11 and the control circuit board 12 can be fixed firmly to the base 14, it becomes easy to produce a relative displacement between the two.

Thus, it is possible that peeling, breakage, etc. might occur in the soldering portion of the control circuit side connecting terminals 107 by such a relative displacement.

Figure 19A:
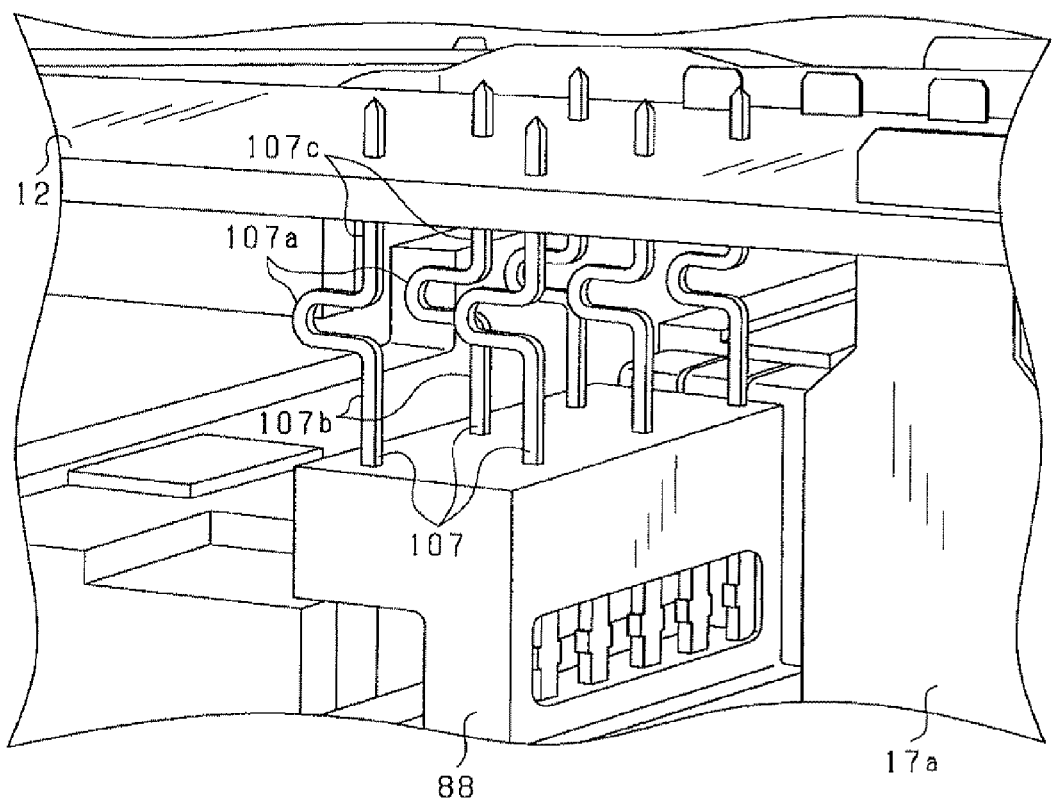
FIGS. 19A and 19B show enlarged views of a composition of circuit board side connecting terminals.
Figure 19B:
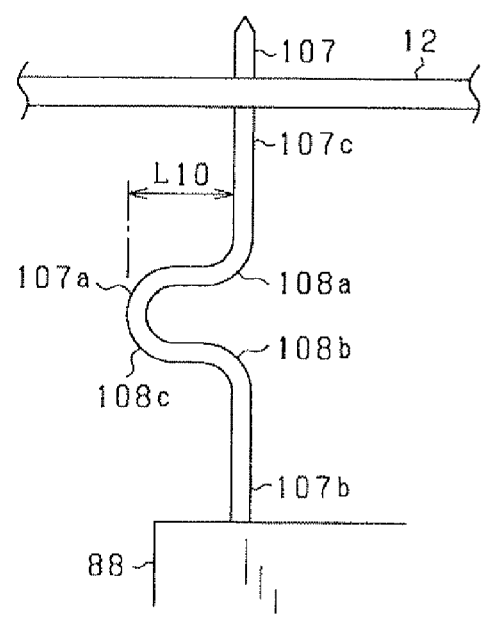

Then, in order to solve the inconvenience caused by the relative displacement between the two, as shown in FIG. 19A and FIG. 19B, the bent portion 107a as a displacement absorption part is formed in each of the control circuit side connecting terminals 107.

The bent portion 107a is bent and formed in the different direction from the longitudinal direction of the control circuit side connecting terminal 107, and is curved in a U-shape.

In this case, all of the plurality of control circuit side connecting terminals 107 is bent in the same direction to form the bent portions 107a.

In addition, both a base side straight portion 107b below the bent portion 107a and a tip side straight portion 107c above the bent portion 107a of the control circuit side connecting terminal 107 are extending in the vertical direction (in other words, extending in a direction that intersects perpendicularly with the circuit board surface), and are formed aligning in the same straight line.

As shown in FIG. 19B, the bent portion 107a has three curved portions 108a, 108b, and 108c, and a swelling direction of the curved portions 108a and 108b of upper and lower sides and an inflating direction of the circle part 108c in between the two are reversed mutually.

In this case, assuming that stress acts on the control circuit side connecting terminals 107 in a compressing direction or in a pulling direction, each curved portion 108a to 108c is preferred be formed with a curvature radius that does not produce superfluous stress concentration.

The curvature radius of each curved portion 108a to 108c is configured to a curvature radius larger than a thickness (or a diameter) of the control circuit side connecting terminal 107 in the present embodiment.

Moreover, three curved portions 108a to 108c are formed so that elastic deformation may not concentrate on any one of them.

Specifically, curvature radii of three curved portions 108a to 108c are substantially the same.

Thereby, when stress acts on the control circuit side connecting terminals 107 with the vibration generated, etc., bending stress concentrating on any of the curved portion 108a to 108c can be suppressed, and therefore can protect the control circuit side connecting terminals 107.

Moreover, in the bent portion 107a, an overhanging distance (L10 in FIG. 19B) in a direction that intersects perpendicularly with the longitudinal direction of the control circuit side connecting terminal 107 is configured smaller than a distance between the control circuit side connecting terminals 107 in the control circuit board 12 and the terminal supporting part 88.

Thereby, interferences between the control circuit side connecting terminals 107 will not occur.

Here, the stepped part that differs height distance from the base plate 21 is disposed onto the top surface (the side opposite to the base plate 21) of the battery pack module 11 as mentioned above, and a distant space is formed between a part lowered by the stepped part in the battery pack module 11 and the control circuit board 12 (refer to FIG. 2).

Then, the control circuit side connecting terminals 107 are disposed in the distant space.

That is, the control circuit side connecting terminals 107 is disposed in the battery group G2 side that is the lower group among the two battery groups G1 and G2 of the battery pack module 11.

In this case, although the battery pack module 11 and the control circuit board 12 are disposed facing each other in the position where they overlap each other, a space for disposing the bent portion 107a can be secured by using the space formed by the stepped part in the top surface of the battery pack module 11, thereby, a desired function that absorbs displacement can be given.

That is, if the battery pack module 11 and the control circuit board 12 are too close to each other, it becomes difficult to form the bent portions 107a in the control circuit side connecting terminals 107 that connect the both.

However, by a moderate space being secured as mentioned above, the bent portions 107a in the control circuit side connecting terminals 107 can be conveniently formed.

By forming the bent portions 107a in the control circuit side connecting terminals 107 as mentioned above, even if any displacement occurs when the battery pack module 11 and the control circuit board 12 get closer or get apart, the position displacement mentioned above can be absorbed by a deformation of the bent portion 107a in the control circuit side connecting terminal 107.

Moreover, it can also be coped with even if the position displacement occurs in a direction along the circuit board surface (horizontal direction in the figure).

Therefore, inconveniences from mechanical overloads acting on any of the battery pack module 11, the control circuit board 12 and the control circuit side connecting terminals 107 by the relative displacement mentioned above can be suppressed.

When assembling the control circuit board 12 to the battery unit 10, the control circuit side connecting terminals 107 are inserted to the through holes 113 of the control circuit board 12, and in this condition, the control circuit board 12 is fixed to the base 14 with fixing screws.

In this case, if the distance errors occur in each part, it is concerned that the control circuit side connecting terminals 107 may be unable to be inserted into the through holes 113, or superfluous load may be applied to the control circuit side connecting terminals 107 when fixing the control circuit board 12 to the base 14.

However, these problems regarding the assembling of the control circuit board 12 can be suppressed by forming the bent portion 107a in the control circuit side connecting terminal 107.

The submergence sensor 122 as a submergence sensor is connected to the control circuit board 12 through an electric wiring 121, as shown in FIG. 18.

The submergence sensor 122 detects submergence of the battery unit 10 when detecting the water permeated into the battery unit 10.

The submergence sensor 122 has a circuit board 122a and a water detector 122b mounted on a top surface of the circuit board 122a as a composition.

In addition, as shown in FIG. 2, the submergence sensor 122 is attached to the sensor mount 59 by fixing the circuit board 122a on the sensor mount 59 of the battery case 42.

Here, an explanation is added about an attaching position of the control circuit board 12 and the submergence sensor 122 in the battery unit 10.

The submergence sensor 122 is disposed in a position lower than the top end part of the shroud section 23 of the wall section 22 (a position nearer to the base plate 21 than the wall top end part of the wall section 22) in a space within the case 16 surrounded by the wall section 22 by attaching the sensor 122 to the sensor mount 59 formed unitarily in the battery case 42.

Moreover, the control circuit board 12 is disposed in a position higher than the top end part of the shroud section 23 (a position distant from the base plate 21 than the wall top end part of the wall section 22) by fixing the control circuit board 12 to the top end parts of the supporting pillars 24 of the wall section 22.

That is, the submergence sensor 122 is disposed in the position lower than a water infiltration height that is a height from water infiltrates into the inside of a case, and the control circuit board 12 is disposed in the position higher than the water infiltration height in the battery case 42.

Explaining with FIG. 2, the height of the shroud section 23 of the wall section 22 (the height from the bottom of the battery unit 10) is H1.

On the other hand, the height of the submergence sensor 122 is H2 and the height of and the control circuit board 12 is H3.

The relation between these heights becomes H2<H1, H3>H1.

In this case, a flood to the space within the case 16 does not occur until the water level exceeds the wall height (H1) of the wall section 22 under the situation where the vehicle is flooded with the water and the battery unit 10 is sunk.

Then, when the water level exceeds the wall height (H1) of the wall section 22, the flood (i.e., submergence) is detected by the submergence sensor 122 with a starting of the flooding to the space within the case 16.

Since the control circuit board 12 is not flooded yet when the flooding is started, the CPU (control section) of the control circuit board 12 can perform dispositions such as suspending the charge and discharge of the battery pack module 11 by itself based on a detected signal of the submergence sensor 122 before a functional stop, etc. of the battery unit 10 caused by the flood.

Since the positions in the height direction of the top end part (wall top end part) of the shroud section 23 and the control circuit board 12 are different, a gap that has a size of H3-H1 is formed in the height direction between the both (refer to FIG. 2).

Therefore, when the water permeates, the water will go up through the gap mentioned above and will infiltrate into the space within the case 16.

Therefore, permeation of water is detectable by the submergence sensor 122 before the water level reaches at the height position of the control circuit board 12.

Moreover, as mentioned above, the base 14 and the cover 15 of the accommodation case 16 are assembled in the condition where the wall section 22 of the base 14 is disposed inside the case 16 and the hanging walls 36 of the cover 15 are disposed outside the case 16 so that they overlap in and out in the horizontal direction (refer to FIG. 2 and FIG. 3).

Therefore, in an extent where the battery unit 10 is slightly flooded with the water or water is splashed onto the battery unit 10, for example, the submergence sensor 122 does not detect the submergence, thus an incorrect detection of submergence is suppressed.

Thereby, unnecessary termination of the charge and discharge of the battery pack module 11, etc. is suppressed.

<Restraining Plate 13>

Next, the restraining plate 13 is explained.

For the attached condition of the restraining plate 13 in the battery unit 10, FIG. 2, FIG. 5, and FIG. 6 should be referred.

Figure 20A:
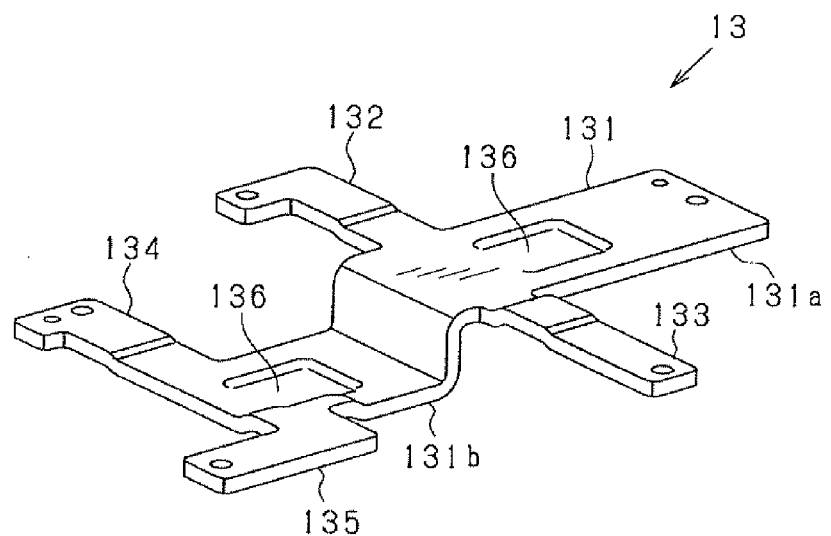
FIGS. 20A and 20B show views of a composition of a restraining plate.
Figure 20B:
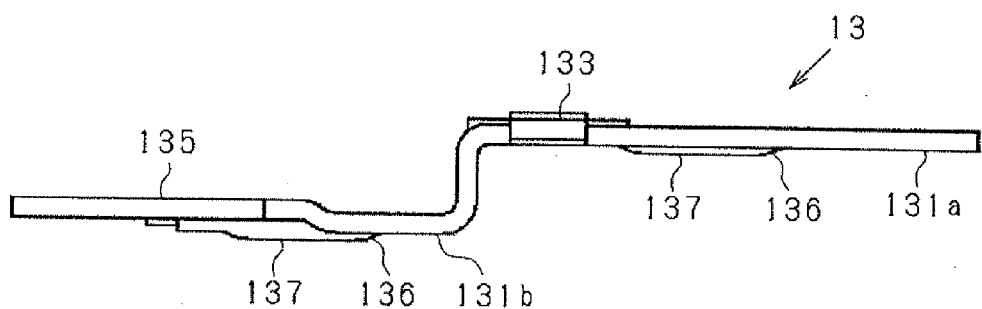

As shown in FIG. 20A and FIG. 20B, the restraining plate 13 is made of a tabular high-rigid metal plate that has a predetermined thickness (about several millimeters, for example).

The restraining plate 13 has a stepped plate 131 that extends in a direction towards the stepped part of the top surface of the battery pack module 11 (battery case 42) and a plurality of arm plates 132 to 135 that extend sideways from the stepped plate 131.

That is, the restraining plate 13 has a bent shape corresponding to the shape of the stepped part of the top surface of the battery pack module 11.

An end part of an upper deck of the stepped plate 131 and tips of each arm plate 132 to 135 are used as fixing portions for fixing the restraining plate 13 to the base 14, and each of these portions are provided with penetration holes for inserting fixing screws.

That is, the restraining plate 13 is attached to the base 14 by screw-fastening the end part of the upper deck of the stepped plate 131 and the tips of each arm plate 132 to 135 to the top end parts of the supporting pillars 24 of the base 14.

Thereby, the restraining plate 13 is disposed so as to contact each rising sections (the wall section 22 and the fixing pillars 25) of every direction formed in the base 14 that surround the battery pack module 11.

The restraining plate 13 has a swell suppressing function that suppresses deformation of the single cell 41 of the battery pack module 11 when superfluous swelling of the cell occurs, and has a heat radiating function that radiates the heat occurred in the battery pack module 11 or the control circuit board 12 to outside of the case 16.

Hereinafter, each of these functions is explained.

First, the swell suppressing function is explained.

In addition, the swell suppressing function is realized not only by the restraining plate 13, but the base 14 and the battery case 42 also bear the duty in the battery unit 10, therefore, the base 14 and the battery case 42 are also mentioned here.

Projecting portions 136 that project towards one plate surface side among both plate surface sides are disposed in two places in the stepped plate 131 so as to correspond to each of the battery group G1 with three cells stacked and the battery group G2 with two cells stacked.

That is, the projecting portions 136 are formed in an upper deck side portion 131a and a lower deck side portion 131b of the stepped plate 131, respectively.

The projecting portions 136 project towards the battery pack module 11 side in a condition where the stepped plate 131 is installed in the base 14.

The projecting portions 136 have contacting surfaces 137 that contact with the battery pack module 11 (swelled portions in sides opposite to the base plate 21 side) when swelling occurs of the single cell 41.

Moreover, as mentioned above, the projecting portions 32 are formed projecting upwardly in the base plate 21 of the base 14 (refer to FIG. 8A).

The projecting portions 32 have the contacting surfaces 33 that contact with the battery pack module 11 (swelled portions in the base plate 21 side) when swelling occurs on the single cell 41.

It should be appreciated that the projecting portion 32 of the base 14 is equivalent to a first projecting portion, and the projecting portion 136 of the restraining plate 13 is equivalent to a second projecting portion.

Hereinafter, for convenience, the projecting portion 32 equivalent to the first projecting portion is also called a lower side projecting portion 32 and the projecting portions 136 equivalent to the second projecting portion is also called an upper side projecting portion 136.

As shown in FIG. 2, the upper side projecting portions 136 and the lower side projecting portions 32 are disposed in the vertical positions with the battery pack module 11 therebetween when the battery pack module 11 and the restraining plate 13 are assembled to the base 14.

In this case, the lower side projecting portions 32 are formed so that they contact areas that become central areas of the bottom surface sides of the single cells 41 among the bottom plates 55a of the battery case 42.

In addition, the upper side projecting portions 136 are formed so that they contact areas that become central areas of the top surface sides of the single cells 41 among the top plates 55b of the battery case 42.

Especially in the assembled condition shown in FIG. 2 in the present embodiment, the top plate 55b of the battery case and the upper side projecting portions 136 of the restraining plate 13 are not in contact if the swell is not occurred on the single cell 41, and a predetermined gap is formed between the top plate 55b of the battery cases 42 and the upper side projecting portions 136 of the restraining plate 13.

This gap (separating distance) is 0.3-1.0 mm, for example. In addition, the bottom plate 55a of the battery case 42 and the lower side projecting portion 32 of the base 14 are in contact below the battery pack module 11.

Each single cell 41 is stacked in a thickness direction of the battery in the battery pack module 11, and when swelling occurs on each of the single cell 41, the amount of the swell in the central areas of both top and bottom surfaces of the single cell 41 becomes a maximum.

At this time, the condition where the bottom plate 55a of the battery case 42 contacts the lower side projecting portion 32 is maintained below the battery pack module 11.

Moreover, the swell of the single cell 41 is permitted according to the amount of the gap in above the battery pack module 11, and when the single cell 41 swells to the amount of the gap, the top plate 55b of the battery case 42 contacts the upper side projecting portions 136 of the restraining plate 13.

Since the restraining plate 13 is made of a high rigidity plate and does not deform elastically even if the restraining plate 13 receives the load caused by the swell of the single cell 41, the swell of the single cell 41 is suppressed under the condition where the top plate 55b of the battery case 42 is contacting the upper side projecting portions 136.

Thereby, the deformation of the single cell 41 due to swelling can be suppressed.

Here, the separating distance of the battery case 42 and the restraining plate 13 in a position of a maximum swell that includes a portion where the amount of the swell becomes the maximum when the single cell 41 swells is different from other positions, and the separating distance is smaller in the position of the maximum swell.

That is, the separating distance of the battery case 42 and the restraining plate 13 is different in an area corresponding to the central area of the top surface of the single cell 41 and the other areas.

The upper side projecting portions 136 are formed on the restraining plate 13 by projecting the parts of it as a specific composition.

Therefore, when swelling occurs on each single cell 41, the contacting surfaces 137 of the upper side projecting portions 136 contact the battery case 42 (swelled portions in sides opposite to the base plate 21 side) preferentially rather than other portions in the restraining plate 13.

Moreover, when swelling occurs on each single cell 41, the contacting surfaces 33 of the lower side projecting portions 32 contact the battery case 42 (swelled portions in the base plate 21 side) preferentially rather than other portions similarly in the base 14.

In the battery pack module 11, such composition is suitable for suppressing the swell in the areas where the amount of the swells becomes the maximum in the single cell 41.

Moreover, the partition plates 56 intervene between each single cell 41 stacked vertically in the battery case 42, and when swelling occurs on each single cell 41, the swell is suppressed also by each single cell 41 contacting the partition plates 56.

In this case, the contact between the single cell 41 can be suppressed by the partition plates 56 when the swell is occurring.

Next, the heat radiating function of the restraining plate 13 is explained.

As shown in FIG. 2, the restraining plate 13 is disposed along the top surface of the battery pack module 11.

A portion in an upper part of the battery group G2 with two cells stacked is disposed and sandwiched between the battery pack module 11 and the control circuit board 12.

A portion in an upper part of the battery group G1 with three cells stacked is disposed next to the control circuit board 12 in the horizontal direction with the same height position as the control circuit board 12.

The end part of the upper deck of the stepped plate 131 and the tips of each arm plate 132 to 135 are screw-fastened to the top end parts of the supporting pillars 24 of the base 14 in the restraining plate 13.

Therefore, it has a composition that the heat occurring in the battery pack module 11 or the control circuit board 12 escapes to the wall section 22 of the base 14 through the restraining plate 13.

In this case, the restraining plate 13 functions as a heat radiating member and a radiating path is formed by the restraining plate 13 and the wall section 22.

The heat conducted to the wall section 22 of the base 14 through the restraining plate 13 is further conducted to the base plate 21, and radiated to the atmosphere through the ribs 27 formed on the bottom surface of the base plate 21, and the heat is also radiated outside by being conducted from the base plate 21 to the vehicle body.

Especially with the composition mentioned above, by intervening the restraining plate 13 as a heat radiating member between the battery pack module 11 and the control circuit board 12, problems due to the heat acting on both the battery pack module 11 and the control circuit board 12 can be suppressed.

<The Heat Suppressing Structure within the Accommodation Case 16>

The plurality of single cells 41 and power elements P are thought as a heat source with a large calorific value among each component in the battery unit 10.

A composition that makes the influence of heat difficult to reach the single cells 41 and the power elements P is provided in the present embodiment and the composition is explained hereafter.

As shown in FIG. 3, the control circuit board 12 has a first circuit section X1 disposed so as to overlap with the battery pack module 11 in the vertical direction and a second circuit section X2 disposed so as not to overlap with the battery pack module 11 in the vertical direction, and the power elements P are mounted on the second circuit section X2 of the control circuit board 12.

In this case, speaking of an arrangement of the single cells 41 and the power elements P, the single cells 41 and the power elements P are not arranged in positions in the vertical direction, but are arranged in positions separating in the horizontal direction.

Moreover, the element heat radiator 28 is disposed in the position opposite to the circuit board surface of the second circuit section X2 (a surface opposite to the surface where the elements are mounted), and the element heat radiator 28 is disposed side by side relative to the battery is pack module 11 in the direction where the circuit board surface of the control circuit board 12 extends (left-right direction in FIG. 3).

Furthermore, the battery pack module 11 is disposed in the accommodation case 16 in a position where the insulation cover 43 and the exhaust duct 44 face the heat radiating section 28.

In the composition mentioned above, the heat generated in each single cell 41 is directly conducted to the base plate 21 of the base 14, and is also conducted to the base plate 21 through the restraining plate 13 and the wall section 22, and then the heat is radiated to outside the unit from the base plate 21.

On the other hand, the heat generated in the power elements P is radiated to outside the unit through the element heat radiator 28.

At this time, since different radiating routes are provided for the single cells 41 and the power elements P, respectively, and the power elements P are arranged not to overlap with the battery pack module 11 in the control circuit board 12, the heat influences between the single cells 41 and the power elements P are suppressed.

Moreover, the insulation cover 43 and the exhaust duct 44 exist in the power element P side in the battery pack module 11.

In other words, the insulation cover 43 and the exhaust duct 44 made of a synthetic resin are disposed between the plurality of single cells 41 and the element heat radiator 28.

A mutual heat exchange between the single cells 41 and the power elements P are suppressed by an existence of the insulation cover 43 and the exhaust duct 44.

That is, the heat generated in the single cell 41 is not conducted easily to the power elements P, and conversely, the heat generated in the power elements P is not conducted easily to the single cell 41.

Thereby, the heat influence between the single cells 41 and the power elements P are further suppressed.

In addition, it is also considered that the heat of the battery pack module 11 may be conducted to the element heat radiator 28.

In this point, the plurality of fins 30 are formed in the element heat radiator 28 extending from the battery pack module 11 side to an opposite side thereof, and the fins 30 are disposed separately in a side opposite to the battery pack module 11 and in a bottom surface side of the case (refer to FIG. 5 and FIG. 8B).

Therefore, when the heat of the battery pack module 11 is conducted to the element heat radiator 28, the heat is conducted from the battery pack module 11 side to the opposite side thereof and radiated by each fin 30, thus the heat radiation effect is high.

For example, the heat radiation effect can be heightened compared with the composition that only has the plurality of fins 30 disposed aligned from the battery pack module 11 side to the opposite side thereof.

<An Electric Composition of an Electric Power System of a Vehicle>

Figure 21:
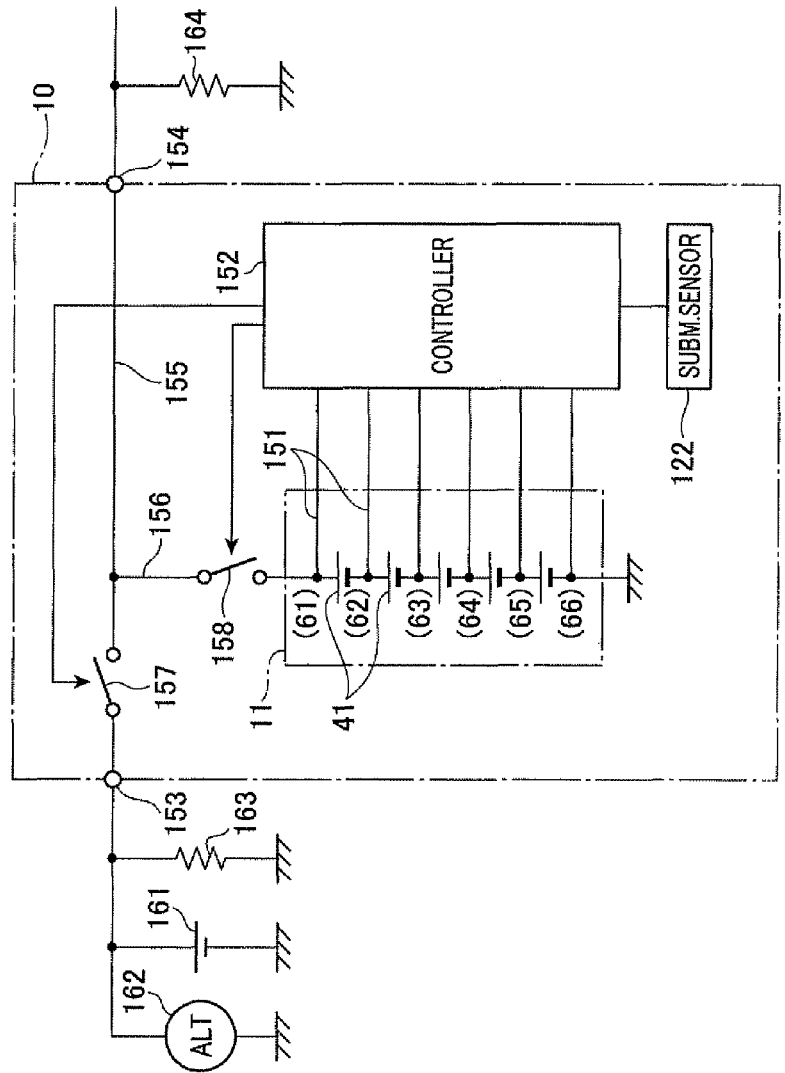
FIG. 21 shows a view of an electric composition of an electric power system.

Next, outline of the electric composition of the present electric power system is explained using FIG. 21.

In the battery unit 10, the battery pack module 11 has the five single cells 41 connected in series, and the anode and cathode of each single cell 41 is connected to a controller 152 through wirings 151.

The controller 152 is constituted by the CPU (Central Processing Unit, control computing element) that performs processing of charge-and-discharge control of the battery pack module 11, and is mounted on the control circuit board 12.

The bus bars 61 to 66 shown in FIG. 12 are disposed in the anode side and the cathode side of each single cell 41, and the wirings 151 are constituted by the metal conductors 101-106 explained in FIG. 17.

Moreover, while connecting terminals 153,154 are disposed in the battery unit 10 and between the connecting terminals 153,154 are mutually connected by a wiring 155, the battery pack module 11 is connected to a wiring 156 branched from the wiring 155.

Moreover, a switch 157 is disposed in the wiring 155 and another switch 158 is disposed in the wiring 156.

The switches 157,158 are switching elements for electric power control that consist of power MOSFET, for example, and are equivalent to the power elements P shown in FIG. 6, for example.

Moreover, the submergence sensor 122 is connected to the controller 152.

In the present in-vehicle electric power system, a lead-acid battery 161 is provided other than the battery unit 10 as a power supply, and the lead-acid battery 161 is connected to the connecting terminal 153 of the battery unit 10.

A charging to the battery unit 10 and the lead-acid battery 161 by the power generator 162 (alternator) is performed suitably.

Moreover, a starter 163 for starting an engine is disposed as an electric load, and when the engine is started by using the starter 163, the electric power is supplied to the starter 163 fundamentally by the lead-acid battery 161.

On the other hand, in the battery unit 10, although all are not shown, electric loads 164 other than the starter, such as an audio equipment and navigation equipment, are connected to the connecting terminal 154, and the electric power is supplied to the current consumers 164 from the battery pack module 11.

Briefly explaining the control of the switch 157 by the controller 152, ON (close) and OFF (open) of the switch 157 is controlled based on a power stored in the battery pack module 11 and a power stored in the lead-acid battery 161.

Specifically, if the power stored in the battery pack module 11 is more than a predetermined value K1, the switch 157 is turned off.

On the other hand, if the power stored in the battery pack module 11 is less than the predetermined value K1, the switch 157 is turned on and the charging of the battery pack module 11 with the power generator 162 is performed.

Moreover, if the power stored in the lead-acid battery 161 is more than a predetermined value K2 when starting the engine by the starter 163, the switch 157 is turned off and the electric power is supplied to the starter 163 from the lead-acid battery 161.

On the other hand, if the power stored in the lead-acid battery 161 is less than the predetermined value K2, the switch 157 is turned on and the electric power is supplied to the starter 163 from the battery unit 10.

The vehicles by which the present electric power system is installed has an idling stop function that stops the engine automatically according to a running condition of the vehicle when an ignition switch is ON, and when predetermined automatic-stop conditions are satisfied, the engine is automatically stopped by an in-vehicle ECU (idling stop ECU).

Moreover, if a predetermined re-start conditions are satisfied after the automatic engine stop, the starter 163 is driven by the in-vehicle ECU, and the engine re-starts.

As the automatic-stay conditions, it is included that an accelerator is OFF, that a brake is ON, that a vehicle speed is below predetermined speed, etc., for example.

Moreover, as the re-start condition, it is included that the accelerator is ON, that the brake is OFF, etc., for example.

<Installation of the Battery Unit 10>

Although not specifically shown in the figures, the battery unit 10 is disposed on a floorboard of the vehicle that forms a passenger compartment of the vehicle, and more specifically, the battery unit 10 is disposed beneath a front seat in the vehicle so that the base plate 21 of the base 14 becomes level.

Since the battery unit 10 is disposed in the passenger compartment of the vehicle, water or mud, etc. is hardly poured on the battery unit 10 during the vehicle is running compared with a case where the battery unit 10 is disposed in an engine compartment, for example.

The battery unit 10 may be disposed on a place other than beneath the front seat.

For example, the battery unit 10 may be disposed in a space between a backseat and a trunk, a space between a driver's seat and a passenger's seat, etc.

According to the present embodiment explained in full detail above, the following outstanding effects are obtained.

The control circuit board 12 is disposed in the position higher than the wall top end part (the top end part of the shroud section 23) of the wall section 22, while the submergence sensor 122 is disposed in the space within the case 16 surrounded by the wall section 22, and in the position lower than the wall top end part (the top end part of the shroud section 23) of the wall section 22.

Therefore, flooding of the space within the case 16 does not occur until the water level exceeds the wall height of the wall section 22 under the situation where the vehicle is flooded with the water and the battery unit 10 is sunk.

Then, when the water level exceeds the wall height of the wall section 22, the flood (i.e., submergence) is detected by the submergence sensor 122 with a starting of the flooding of the space within the case 16.

Since the control circuit board 12 is not flooded yet when the flooding is started, the control section of the control circuit board 12 can perform dispositions such as suspending the charge and discharge of the battery pack module 11 by itself based on a detected signal of the submergence sensor 122 before a functional stop, etc. of the battery unit 10 caused by the flood.

Moreover, since the wall section 22 is formed so as to surround the battery pack module 11 in the base 14, if the battery unit 10 is only slightly flooded with water or water is splashed onto the battery unit 10, for example, the submergence sensor 122 does not detect the submergence, thus an incorrect detection of submergence is suppressed.

Thereby, unnecessary termination of the charge and discharge of the battery pack module 11, etc. is suppressed.

The base 14 and the cover 15 of the accommodation case 16 are assembled in the condition where one of the wall section 22 of the base 14 and the hanging walls 36 of the cover 15 is disposed inside the case 16 and the other is disposed outside the case 16 so that they overlap in and out in the horizontal direction.

Thereby, in the condition where the battery unit 10 is flooded with the water, the water outside the unit infiltrates into the space within the case 16 after passing through the gap between the wail section 22 and hanging walls 36, and thus the water flowing into the space within the case 16 instantly can be prevented.

Therefore, when the battery unit 10 is flooded with water, it is possible to take time from water detection of the submergence sensor 122 to the submergence of the control section, and can terminate reliably the charge and discharge of the battery pack module 11 by the control section.

The base 14 and the cover 15 are assembled in the condition where the wall section 22 of the base 14 is disposed inside the case 16 and the hanging walls 36 of the cover 15 are disposed outside the case 16.

By this, the gap between the wall section 22 of the base 14 and the hanging walls 36 of the cover 15 is opened wide in the bottom (the base plate 21 side of the base 14).

Therefore, if water is slightly splashed onto the outside of the case 16, water does not infiltrate into the inside of the case 16 and an erroneous detection of submergence can be suppressed.

The control circuit board 12 is fixed onto the top end part of the supporting pillars 24 that extend higher than the top end part of the shroud section 23 (i.e., to a side opposite to the base plate side) in the wall section 22 of the base 14.

By this, a gap is formed between the top end part of the shroud section 23 and the control circuit board 12.

In this case, in the water level raising process, since the water infiltrates into the space within the case 16 through the gap mentioned above, flooding of the control circuit board 12 when the water infiltrates can be suppressed.

Since the gap s formed between the top end part of the shroud section 23 and the control circuit board 12, the connection condition of the control circuit board 12 and the battery pack module 11, etc. can be visually checked through the gap in the condition where the cover 15 is removed.

The sensor mount 59 for mounting the submergence sensor 122 is integrally formed to the outside of the side of the battery case 42.

Thereby, the submergence sensor 122 can be attached simply.

That is, when installing and fixing the battery pack module 11 to the base 14, the submergence sensor 122 can be installed in a desired height position simultaneously with the installing and fixing of the battery pack module 11.

(Other Embodiments)

The embodiment mentioned above may be changed as follows, for example.

The composition of the battery case 42 in the battery pack module 11 may be changed as shown in FIG. 22.

FIG. 22 is a sectional view where a part of the composition of FIG. 14 is changed.

It should be appreciated that, in the following embodiments, components identical with or similar to those in the embodiment mentioned above are given the same reference numerals, and structures and features thereof will not be described in order to avoid redundant explanation.

A battery case 171 shown in FIG. 22 has perimeter plate 172 that is a perimeter part, and partition plates 173 disposed between the single cells 41 that are stacked vertically, and the battery case 171 has a composition that supports the single cells 41 by contacting at least to a part of the perimeter surface of the single cell 41.

That is, each of five battery accommodation sections (accommodation space) in the battery case 171 is formed as a space where a distance in a vertical direction (distance in a thickness direction of the battery) in a back part of the case is small and a distance in a vertical direction (distance in a thickness direction of the battery) in a entrance of the case is large, and the single cell 41 is supported in a section in a back part of the case where the space becomes narrow.

More specifically, when that the distance in the vertical direction of the back part of the case is defined as L1 and the distance in the vertical direction of the entrance of the case is defined as L2, a relation between the distances is L1<L2.

Moreover, the battery case 171 is capable of some elastic deformation by pushing in the single cell 41, and the distance in the vertical direction of the back part of the case L1 (here, a distance before accommodating the single cell) is slightly smaller than the distance L3 in the thickness direction of the single cell 41.

Therefore, a part of the single cell 41 that is positioned in the back part of the case is firmly fixed to the battery case 171 in the vertical direction by pushing the single cell 41 into the back part of the case.

On the other hand, gaps are formed between the battery case 171 and a perimeter surface of the single cell 41 in the vertical direction at the entrance of the case.

In this case, a portion of the single cell 41 protruded from the battery case 171 is supported by the insulation cover 43, therefore shakiness of the single cell 41 does not occur even if the gaps are formed between the battery case 171 and the perimeter surface of the single cell 41 at the entrance of the case.

The gap between the single cell 41 and the battery case 171 in the vertical directions is formed in central areas of the single cell 41, i.e., parts where the amount of the swells becomes the maximum when swelling occurs in the single cell 41, and the top surface and the bottom surface of the battery in the battery central area face the battery case 171 with a predetermined gap therebetween.

Although the gap distance is about 1 mm in the present embodiment, it may be disposed within the limits of 0.5 to 2 mm.

In the battery case 171, the difference in distance of L1 and L2 may be realized by disposing slopes that incline relative to a horizontal direction to a bottom plate 172a of the battery case 171 and a top plate 172b of the partition plates 173.

Moreover, the difference may be realized by disposing level difference surfaces in each plate.

In the composition of FIG. 22 mentioned above, in the battery case 171, each stacked single cell 41 is disposed with a predetermined separating distance relative to the partition plates 173 in the condition where the swell in a stacking direction is not occurred.

That is, the central areas of the top and bottom surfaces of each single cell 41 are separated from the battery case 171, and it has a composition that swell of each single cell 41 is permitted in the battery case 171 by the gap between the separated portions.

In this case, if of the swell of the single cell 41 is suppressed regularly by the contact of the perimeter side of the single cell 41 and the battery case 171, it is concerned that superfluous load is applied to each single cell 41 accordingly, however, such inconvenience can be suppressed.

In the embodiment mentioned above, the plurality of supporting pillars 24 are formed extending upwardly from the shroud section 23 in the wall section 22 of the base 14, and the battery pack module 11, the control circuit board 12, and the restraining plate 13 are fixed to the supporting pillars 24.

However, the above structure may be modified to have tabular or pillar-shaped rising sections are formed extending upwardly on the base plate 21 independently from the wall section 22, and the battery pack module 11, the control circuit board 12, and the restraining plate 13 are fixed to the rising sections.

In the embodiment mentioned above, the base 14 and the cover 15 are assembled in the condition where the wall section 22 of the base 14 is disposed inside the case 16 and the hanging walls 36 of the cover 15 are disposed outside the case 16 so that they overlap in and out in the horizontal direction.

However, the above structure may be modified, that the base 14 and the cover 15 may be assembled in the condition where the wall section 22 of the base 14 is disposed outside the case 16 and the hanging walls 36 of the cover 15 are disposed inside the case 16 so that they overlap in and out in the horizontal direction.

With this composition, when the battery unit 10 is flooded with the water, the water flows downwardly from the top between the wall section 22 and the hanging walls 36, and the water permeates into the accommodation case 16 from the lower end of the hanging walls 36.

That is, the water permeates in a position lower than the wall section 22 (shroud section 23) of the base 14.

Therefore, it can be made difficult for the control circuit board 12 to be flooded with the water at the beginning of the water infiltration.

In the embodiment mentioned above, the control circuit board 12 is disposed so that a part thereof overlaps (so as to face each other) with the battery pack module 11.

However, the above structure may be modified that the control circuit board 12 may be disposed so that an entire part thereof overlaps (so as to face each other) with the battery pack module 11.

In the embodiment mentioned above, the sensor mount 59 is formed integrally with the battery case 42, and the submergence sensor 122 is attached to the sensor mount 59.

However, this composition may be changed, and a sensor mount may be formed integrally with the base 14.

The sensor mount may be disposed in either the base plate 21 of the base 14 or in the wall sections 22, for example.

In the embodiment mentioned above, the battery unit 10 is disposed beneath the seat in the vehicle.

However, the above structure may be modified that it is possible to dispose the battery unit 10 in a dashboard of the vehicle or in the engine compartment.

In the embodiment mentioned above, the lithium ion battery is used as a single cell.

However, the above structure may be modified that other rechargeable batteries, such as a NiCad (nickel-cadmium) battery or a plurality of nickel metal hydride batteries may be used as a single cell.

The battery unit 10 of the embodiment mentioned above may be applied to a hybrid vehicle that uses both an internal-combustion engine and a motor as a power source for driving the vehicle, or to an electric vehicle that has no internal-combustion engine but has only a motor as a power source for driving the vehicle.

What is claimed is:

1. A battery unit comprising:
    a battery pack module that has a plurality of single cells;
    a control circuit board that has a control section that controls a charge and discharge in the battery pack module;
    an accommodation case where the battery pack module and the control circuit board are accommodated;
    a base formed as the accommodation case that has a base plate where the battery pack module is installed and a wall section rising from the base plate so as to surround the battery pack module; and
    a submergence sensor electrically connected to the control section that detects submergence of the battery unit;
    the control circuit board is disposed in a position that is one side of the battery pack module opposite to the base plate, and separated away from the base plate by a distance more than a distance from the base plate to a wall top end part of the wall section; and
    the submergence sensor is disposed in a position nearer to the base plate than to the wall top end part of the wall section that is in a space within the case surrounded by the wall section.

2. The battery unit according to claim 1, wherein,
    the accommodation case has a cover attached to the base,
    the cover has a top plate that covers the control circuit board, and hanging walls extended from the top plate,
    the base and the cover are assembled in a condition where one of the wall section of the base and the hanging walls of the cover is disposed inside the case and another is disposed outside the case so that they overlap in and out in a horizontal direction.

3. The battery unit according to claim 2, wherein,
    the base and the cover are assembled in the condition where the wall section of the base is disposed inside the case and the hanging walls of the cover are disposed outside the case.

4. The battery unit according to claim 1, wherein,
    the wall section has a shroud section continuously formed so as to surround the battery pack module that has a top end part as the wall top end part, and a plurality of supporting pillars that are higher than the wall top end part, and the control circuit board is fixed to the top end part of the supporting pillars.

5. The battery unit according to claim 1, wherein, the battery pack module has a battery case where the plurality of single cells are accommodated, the battery case is installed on the base plate so that the battery case is disposed in a space within the case, and a sensor mount for mounting the submergence sensor is integrally formed to an outside of a side of the battery case.

* * * * *